Sept. 28, 1965  M. DAVIS  3,208,338
AUTOMATIC FOCUS COPY CAMERA
Filed Oct. 7, 1964  6 Sheets-Sheet 1
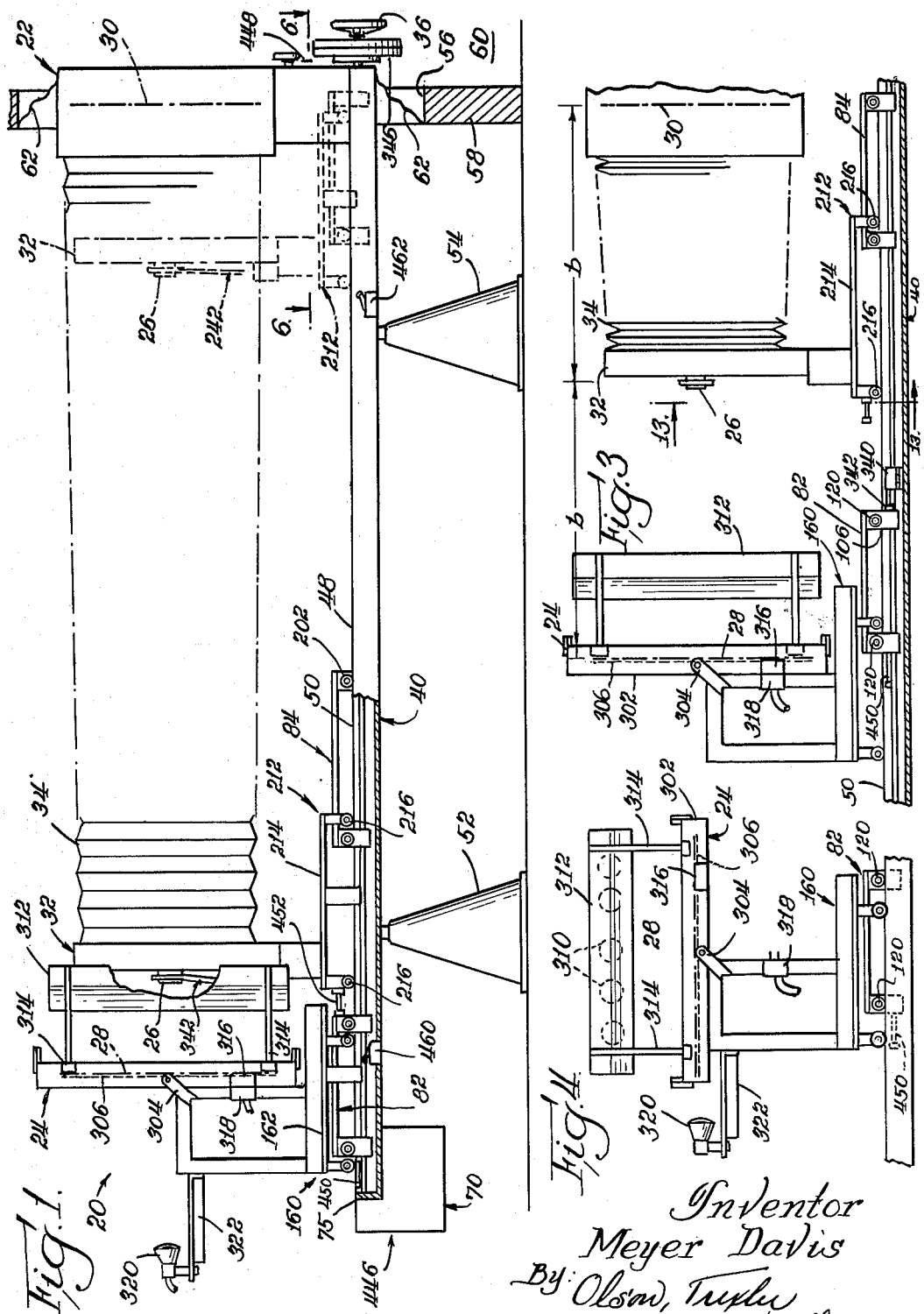
Inventor
Meyer Davis
By Olson, Trexler
Wolters & Bushnell Att'ys.

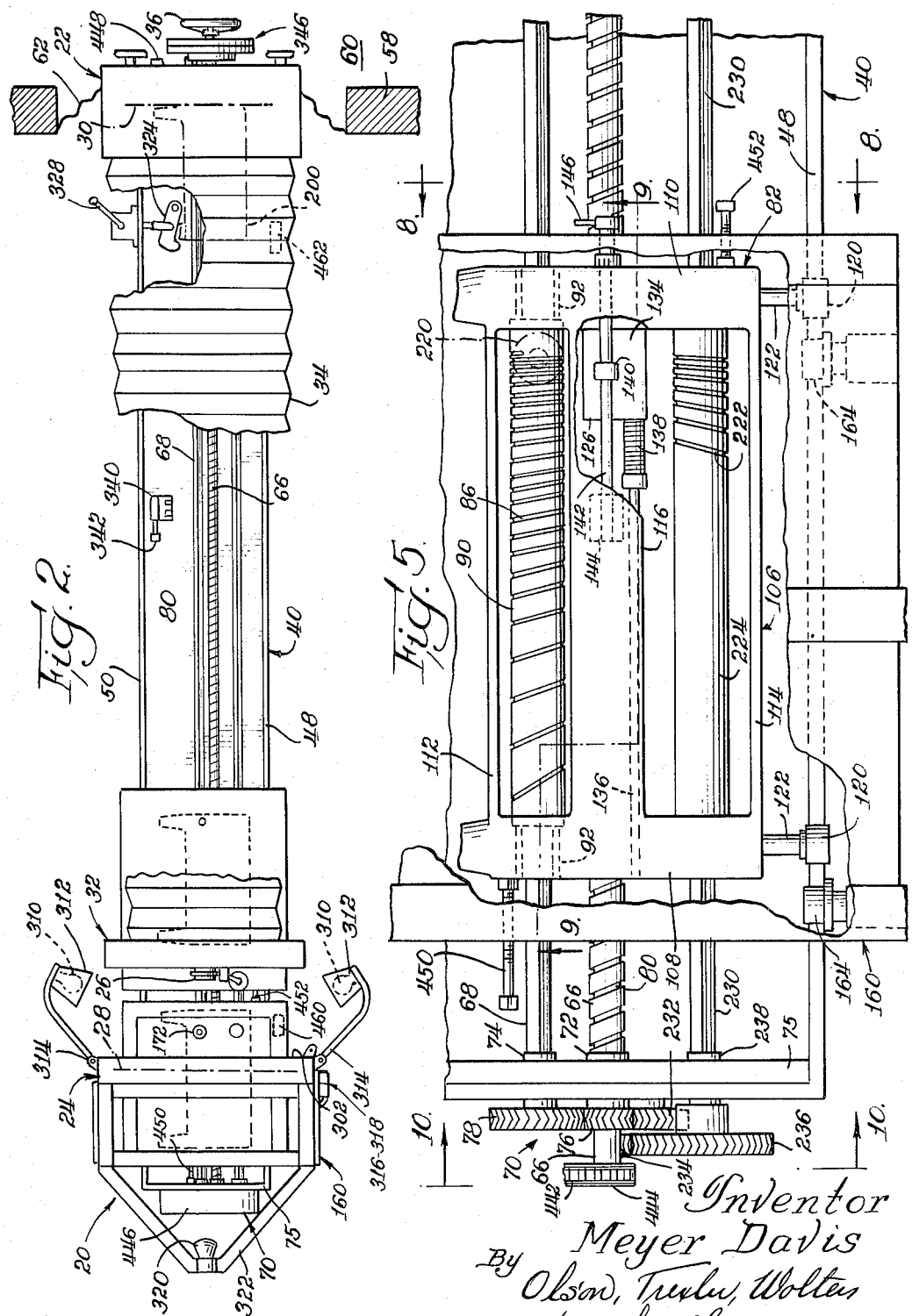

Sept. 28, 1965 M. DAVIS 3,208,338
AUTOMATIC FOCUS COPY CAMERA
Filed Oct. 7, 1964 6 Sheets-Sheet 3
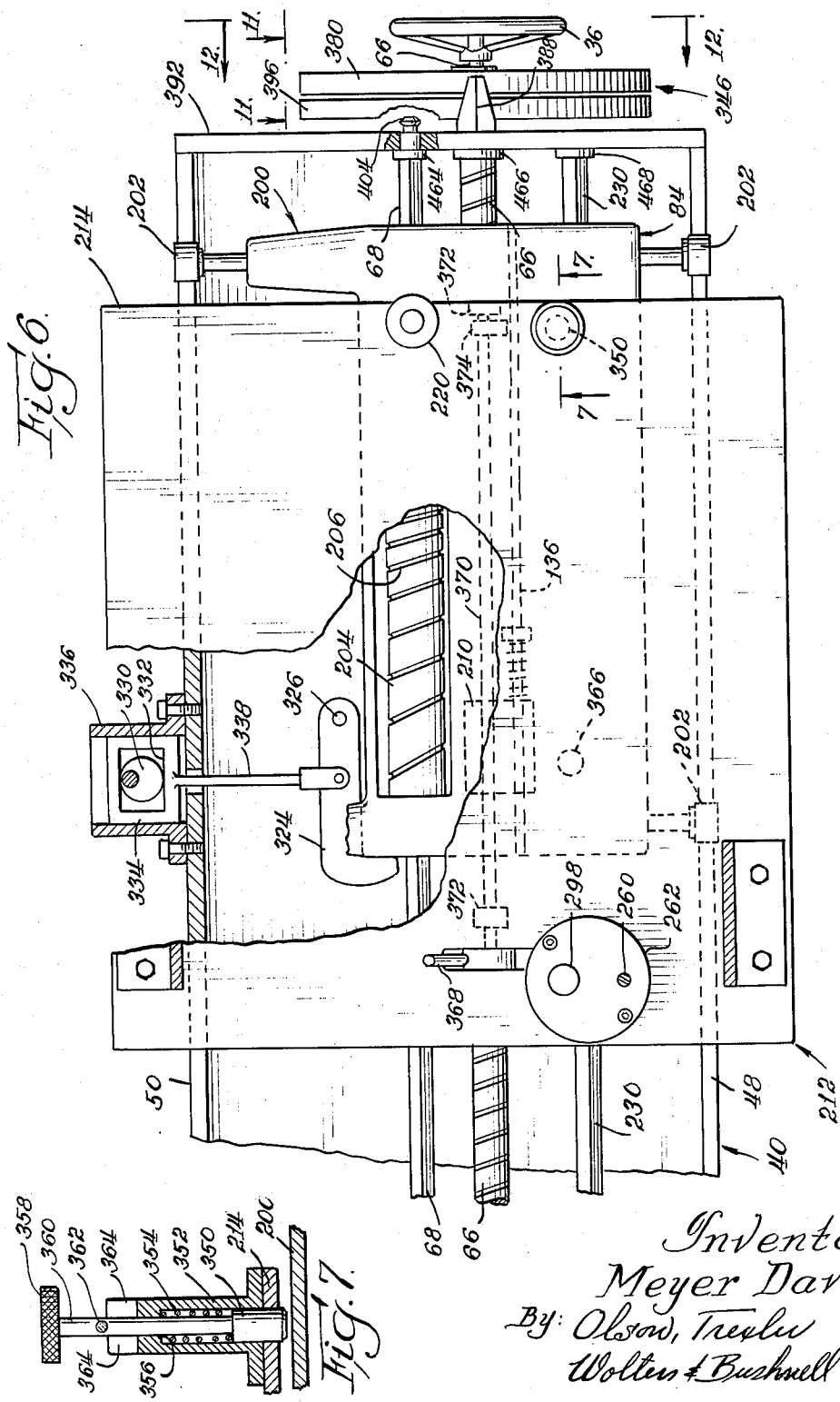
Inventor
Meyer Davis
By: Olson, Trexler
Wolters & Bushnell Att'ys.

Sept. 28, 1965
M. DAVIS
3,208,338
AUTOMATIC FOCUS COPY CAMERA
Filed Oct. 7, 1964
6 Sheets-Sheet 4
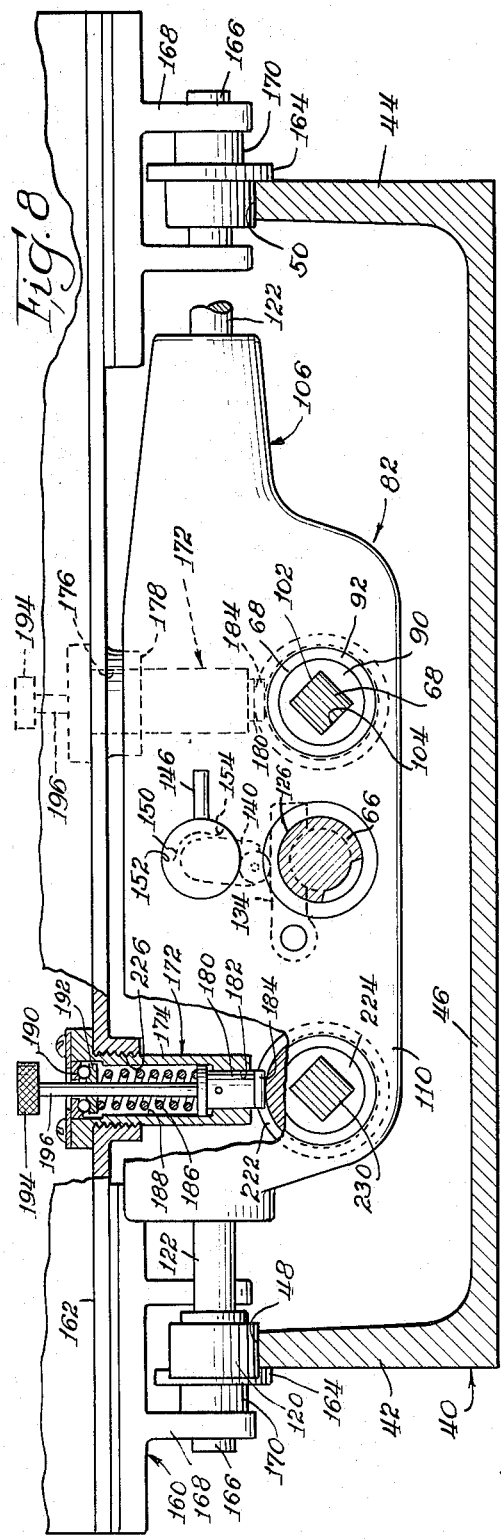
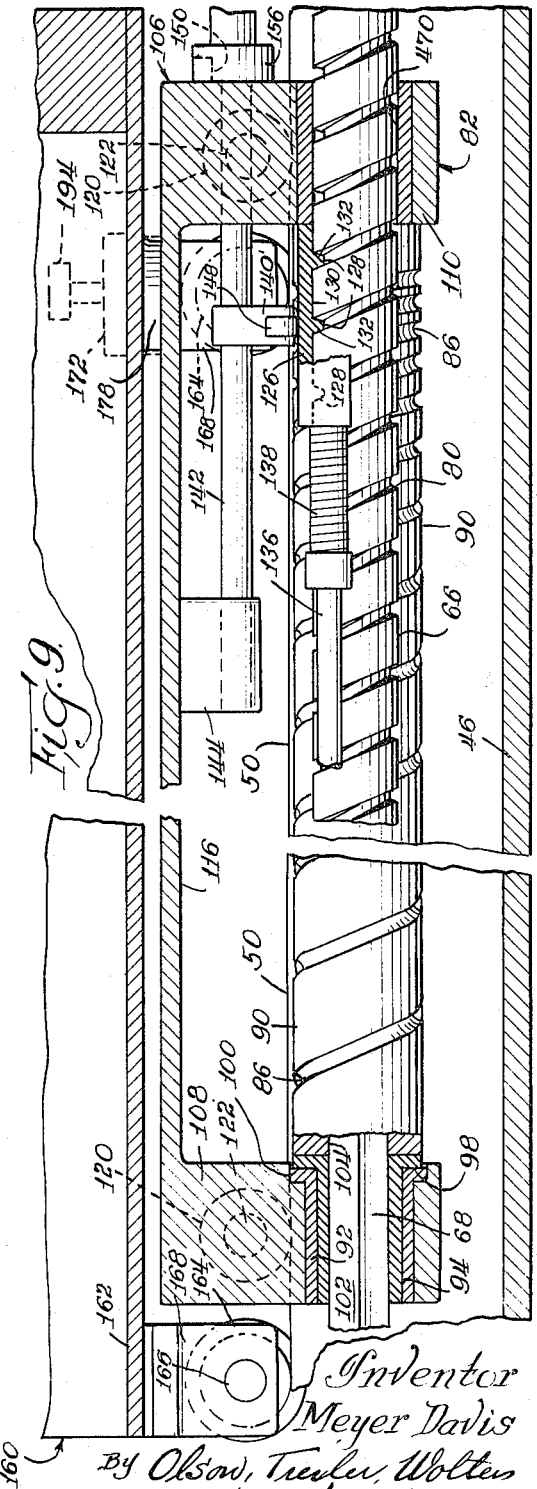
Inventor
Meyer Davis
By Olson, Trexler, Wolters
& Bushnell
Att'ys Sept. 28, 1965  M. DAVIS  3,208,338
AUTOMATIC FOCUS COPY CAMERA
Filed Oct. 7, 1964  6 Sheets-Sheet 5
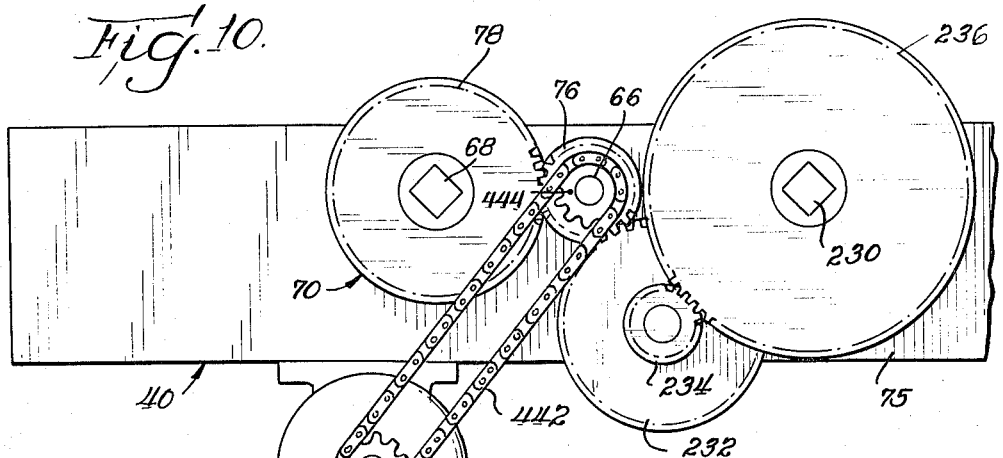
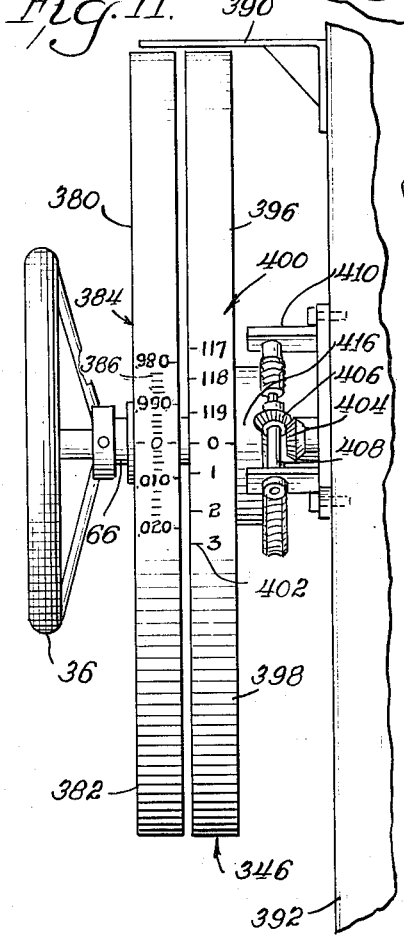
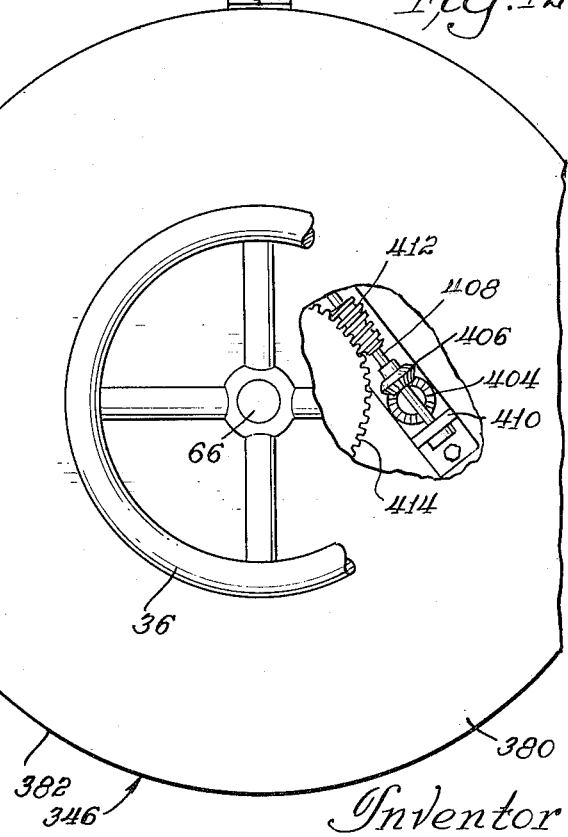
Inventor
Meyer Davis
By Olson, Trexler, Wolters
& Bushnell Attys.

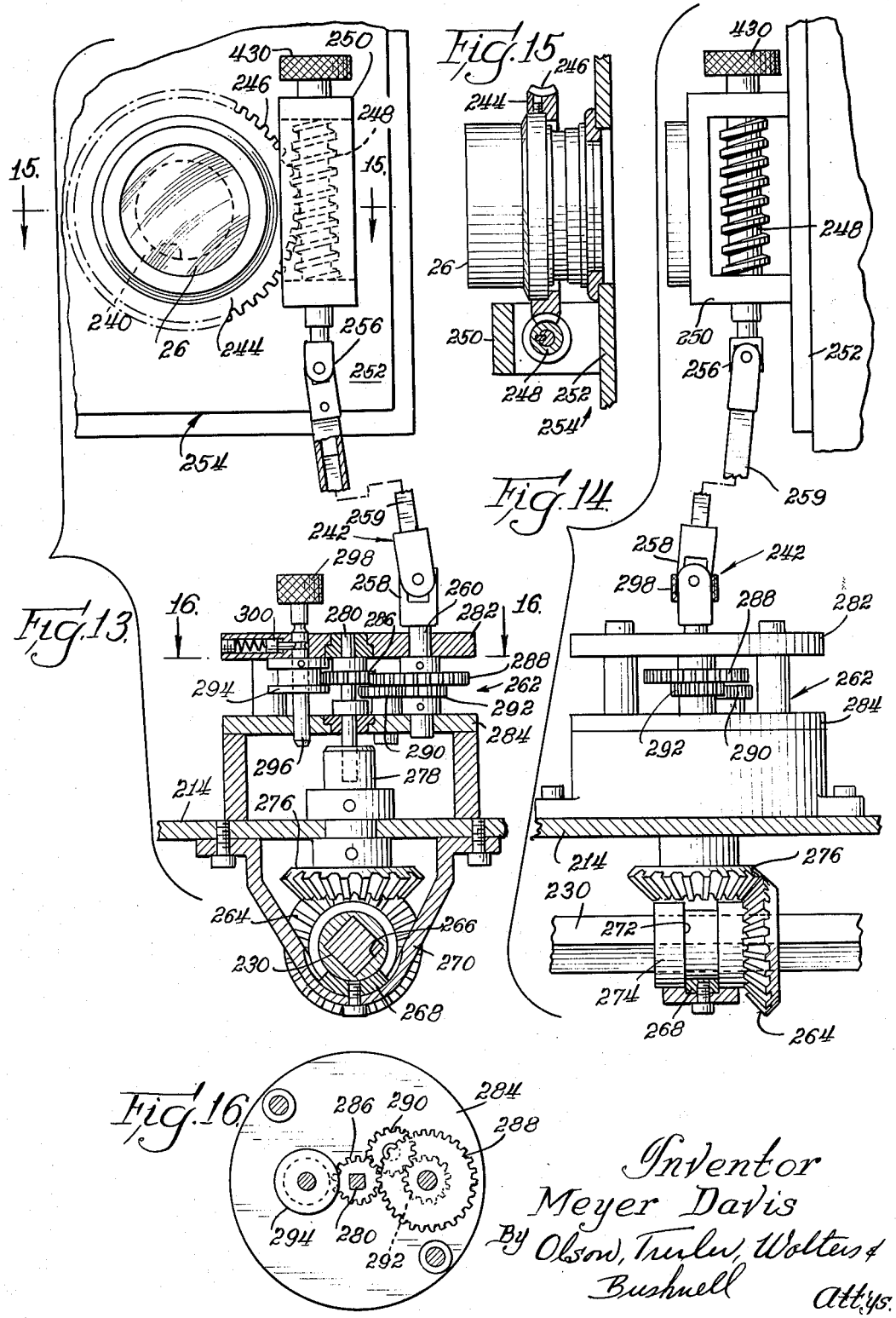

United States Patent Office 3,208,338
Patented Sept. 28, 1965

3,208,338
AUTOMATIC FOCUS COPY CAMERA
Meyer Davis, 1545 E. 60th St., Chicago, Ill.
Filed Oct. 7, 1964, Ser. No. 402,122
34 Claims. (Cl. 88—24)

The present application is a continuation-in-part of applicant's copending application Serial No. 168,718, filed January 25, 1962.

The present invention relates to industrial cameras of a type that is used commercially to produce, from a generally flat copy or scene mounted on a camera, photographic images having a size that can be varied by operation of the camera to be equal to or to be enlargements or reductions to various desired degrees of the size of the copy or scene. Cameras of this type are sometimes referred to as "process" cameras, a term which will be used in this application.

The operation of conventional process cameras in current commercial use requires the personal attendance of skilled operators who command high rates of pay. Even with skilled operators in attendance, the productivity of currently used, conventional process cameras is restricted by the time consumed by operators in determining and in making the various settings which must be adjusted in order to conform the size of the image to the size desired and to provide images of the desired light intensity. Moreover, the spoilage of photographic plates, paper, film and the like due to improper settings of commonly used, conventional process cameras, operated by competent and skilled operators, is a source of considerable expense and delay in the operation of such cameras on a commercial basis.

In the patented art, a process camera incorporating improved principles of operation is disclosed in applicant's prior Patent No. 2,506,347, issued May 2, 1950.

To be of practical value a process camera must not only be sound in theoretical principle but it must also be suited for manufacture at an economically justifiable cost, and it must operate dependably and with accuracy over an extensive service life.

One object of the invention is to provide a new and improved process camera of the character recited which effectively eliminates any need for the exercise of skill or photographic judgment on the part of the operator in the production from flat copy or the like, referred to generally as "copy," of photographic images having any desired size within a wide range of image size in relation to copy size provided by the camera, thus avoiding the expense and inconvenience of having to provide a highly skilled and trained operator for the camera.

Another object is to provide a process camera having a new and improved construction that provides for operation of the camera by an extremely simple and virtually foolproof operating procedure that enables an unskilled operator to produce from copy photographic images having any desired size, within a wide size range in relation to the size of the copy, with assurance that each image is formed in sharp focus with an optimum light intensity.

A further object is to provide an improved process camera of the character referred to that will respond to operation of a single control by the operator to progressively increase or decrease the size of the image of the copy as desired while continuously maintaining the image in sharp focus and continuously maintaining the light intensity of the image at a predetermined optimum value.

Another object is to provide an improved process camera by which an operator can adjust the image size to conform precisely to a desired size, which may differ from the size of the copy photographed, by adjusting a movable control to a position that is a linear function of the readily determined degree to which the desired size of the image differs from the size of the copy, by way of either enlargement or reduction.

Another object is to provide a process camera, of the character recited in the preceding objects, having a new and improved construction that provides many significant economies in the manufacture of the camera, making the camera available at a most reasonable manufacturing cost while at the same time providing a very precise and dependable operational action of the camera over a long service life to the end that the camera and its inherent advantages are effectively made available on a practical commercial basis.

Another object is to provide a process camera, in accordance with the preceding objects, in which image size control movements, that are algebraically cumulative, are produced with assured precision and synchronization by a new and improved camera construction that is also marked by dependability and serviceability over a long service life and an adaptability for economical manufacture.

Another object is to provide a process camera, as recited, in which expeditious resetting of the camera to produce images of different size in relation to the size of the copy is facilitated by most reliable and economical indicator means constructed and connected with the image size control in a manner such that the instantaneous position of the image size control can be quickly read with great fidelity and precision on easy-to-read simple scales.

Another object is to provide a process camera as recited having an improved construction that facilitates quick and easy adjustment of the camera to use lenses of different focal length, the procedure for using the camera being essentially the same for lenses of different focal lengths.

Another object is to provide a process camera in which the objects previously recited are achieved by an improved camera construction that provides significant manufacturing economies and at the same time contributes to a high order of serviceability of the camera by using a number of major components that are basically duplicates of each other and by using common control components to serve a plurality of purposes as the camera is adjusted to vary the size of the image produced.

Another object is to achieve the objects previously recited in a process camera in which the size of the image is progressively adjusted, in the production of images of reduced size and also in the production of images of enlarged size in relation to the size of the copy, by a control element that is set to the same position to produce a certain desired degree of enlargement and the same certain degree of reduction, the degree of enlargement and the degree of reduction both being determined basically from the ratio of the larger to the smaller of the image size and the copy size. A related object is to provide a process camera as recited in the preceding object in which the control element and coacting indicator means are set and used in the same manner to produce images of precise sizes desired using lenses of different focal length in the camera.

Other objects and advantages will become apparent from the following description of the exemplary form of the invention illustrated in the drawings, in which:

FIGURE 1 is a side view of the camera forming the exemplary embodiment of the invention illustrated, an extreme enlarging position of the camera being shown in solid lines with certain parts being broken away for clearness in illustration, an extreme reducing position of the camera lens and its supporting structure being illustrated in dotted lines;

FIG. 2 is a plan view of the camera showing the camera adjusted to the extreme enlarging position illustrated in solid lines in FIG. 1, certain parts of the camera, particularly the bellows structure, being broken away for clearness in illustration;

FIG. 3 is a fragmentary side view similar to FIG. 1, but illustrating the camera adjusted to its "starting" position to produce images having a size equal to the size of the copy;

FIG. 4 is a side view of the copy holder and copy holder support structure showing the copy holder swung to a horizontal position for loading copy;

FIG. 5 is an enlarged plan view on an enlarged scale looking down on the camera structure appearing at the left-hand end of FIG. 2 with parts of the copy holder and carriage structure broken away to reveal underlying components;

FIG. 6 is a fragmentary plan view taken generally with reference to the line 6—6 in FIG. 1 and showing on an enlarged scale components of the lens support and control structure, having reference to the position of the parts illustrated in dotted lines of FIG. 1 and showing certain parts broken away to reveal underlying components;

FIG. 7 is a fragmentary sectional view taken with reference to the line 7—7 of FIG. 6 and showing on an enlarged scale the means used to releasably interlock the lens carriage with the lens control cam carriage;

FIG. 8 is a transverse sectional view on an enlarged scale taken with reference to the line 8—8 in FIG. 5 and showing parts used in supporting and controlling the position of the copy holder;

FIG. 9 is a fragmentary longitudinal sectional view on an enlarged scale taken generally along the irregular line 9—9 in FIG. 5;

FIG. 10 is an end view on an enlarged scale taken generally along the line 10—10 of FIG. 5 and showing the stationary transmission and power drive used in effecting precisely synchronized movements of simple drive structure used in producing the precisely coordinated camera control movements essential to functional control of the camera in the manner desired;

FIG. 11 is a fragmentary side view on an enlarged scale taken with reference to the line 11—11 in FIG. 6 and showing the structure used to effect precise adjustment of the camera and to enable the operator to directly read the precise instantaneous condition of adjustment on simple scales;

FIG. 12 is a fragmentary end view on an enlarged scale taken with reference to the line 12—12 of FIG. 6 and showing the structure of FIG. 11 with certain parts broken away for clearness in illustration;

FIG. 13 is a fragmentary vertical sectional view on an enlarged scale taken generally along the line 13—13 in FIG. 3 and showing components of the automatic lens control drive, certain parts being broken away to reveal inner components;

FIG. 14 is a side view of the lens control structure illustrated in FIG. 13;

FIG. 15 is a fragmentary sectional view of the lens control drive taken along the line 15—15 in FIG. 13; and FIG. 16 is a fragmentary sectional view of the lens control drive taken along the line 16—16 of FIG. 13.

Referring to the drawings in greater detail, the camera 20, FIG. 1, forming the exemplary embodiment of the invention illustrated comprises a plate holder 22 and a copy holder 24 disposed in spaced parallel relaiton to each other, and a lens 26 supported in an intermediate position between the plate holder 22 and the copy holder 24.

The copy holder 24 is designed to support a flat copy or scene to be photographed. The copy or scene of which a photograph is desired will be referred to generally as "copy". Edge views of a typical copy mounted in the copy holder 24 are indicated in FIGS. 1 and 2 by the phantom lines 28. The desired photographic image of the copy 28 is produced on a photosensitive plate, film or other photosensitive element, which for convenience will be referred to generally as a photographic "plate". A typical photographic plate mounted in the plate holder 22 is indicated in FIGS. 1 and 2 by the phantom lines 30.

The lens 26 is mounted on a lens holder 32 disposed between the copy holder 24 and the plate holder 22, FIGS. 1 and 2. Extraneous light is excluded from the space between the lens holder 32 and the plate holder 22 by light excluding means formed by an extensible bellows 34 having opposite ends interconnected respectively with the lens holder and the plate holder.

It will be appreciated from the introduction that the camera 20 is intended for use in producing on a typical photographic plate 30 an image that can be controllably increased or decreased by operation of the camera to equal a predetermined desired size that may differ from the size of the copy 28 from which the image is produced. To vary the size of the image on the plate 30 in relation to the size of the copy 28, it is necessary to move major components of the camera in relation to each other. Because of controlling optical principles of a typical lens 26 used in the camera, it is necessary that movement of major elements of the camera in relation to each other for the purpose of varying the size of the image be coordinated with relative movements of major components of the camera that are essential to maintaining a sharp focus in the image as the size of the image is varied in relation to the size of the copy.

More particularly, the maintenance of a sharp focus in an image, which is adjusted in size on the plane of the plate 30 in relation to the size of the copy 28 from which the image is produced, requires that the spacings each from the other of the lens 26, the copy 28, and the plate 30 be simultaneously varied by mutually coordinated relative movements that are not linear functions of each other.

It is axiomatic that, in order to obtain any particular desired degree of exposure of the photographic plate 30 in photographically recording the image, it is necessary to apply to the photographic plate 30 by means of the image a certain quantity of light which is a function of both the light intensity of the image and the duration of the exposure of the plate 30 to the light image. The application of the desired quantity of light to the plate 30 to produce the desired degree of exposure of the plate 30 to light is complicated by the fact that positional adjustments in relation to each other of the lens 26, copy 28 and plate 30 incident to varying the size of the image and maintaining the image in focus, as previously referred to, has the collateral effect of varying the light intensity of the image itself as the image is produced in the plane of the plate 30. To illustrate this principle by an oversimplification, it will be appreciated that, with other things being equal, decreases and increases in the spacing of the lens 26 from the plane of the plate 30 produce respectively increases and decreases in the light intensity which the lens produces on the plane of the plate 30.

As will be presently described in greater detail, the camera 20 constructed in accordance with the invention is so designed that operation of a single control to progressively vary the size of the image in relation to the size of the copy not only serves to maintain the image continuously in sharp focus, but also serves to automatically condition the machine to produce optimum exposure of the plate 30 for each size of image which is determined by adjustment of the control referred to. More specifically, adjustment of the camera to increase or decrease the size of the image in relation to the size of the copy is effected by rotation of a single manual control 36 to which the camera responds to increase or decrease the size of the image while continuously and automatically maintaining the image in precise focus and continuously maintaining a constant light intensity in the image as the size of the image is varied. Since the light intensity of the image is maintained at an optimum predetermined value that remains constant as the size of the image is varied by rotation of the single control 36 exposure of the plate 30 for a predetermined time will result in optimum photographic recording of images of different size without any necessity on the part of the operator to exercise any particular judgment or make any further settings in order to assure the optimum desired exposure of the plate 30 to light.

The image repeatedly referred to and the size of the image is of course the image of the copy 28 which the lens 26 produces in the plane of the photographic plate 30, or more exactly in the plane of the light sensitive emulsion on the photographic plate. For convenience in description and ease in visualization of the optics involved, reference is made to variation in the size of the image. However, in point of fact the shutter used in the camera is normally closed and for this reason the image normally does not exist and is only imaginary until such time that opening of the shutter allows the lens 26 to produce a real image having a size determined by the camera action which controls the image size.

While the invention is not limited in its application to cameras of any specific size, it is helpful in visualizing the construction and character of a camera incorporating the invention to refer to the dimensions and capacities of the illustrative physical embodiment of the invention in the camera 20 illustrated.

The camera 20 is designed to use either a nineteen inch focal length lens, or a twelve inch focal length lens, interchangeably. It is approximately fourteen feet long and is designed to produce photographic images having any desired size in relation to the size of the copy ranging from twenty-five percent to nine hundred percent of the size of the copy. More particularly, the lens having a focal length of nineteen inches is used to produce photographic images having any desired size ranging from twenty-five percent to four hundred percent of the size of the copy and the lens having a focal length of twelve inches is used to produce images having any desired size ranging from three hundred percent to nine hundred percent of the size of the copy.

The plate holder 22 and the copy holder 24 have sizes which are generally in proportion to the fourteen foot length of the camera, the plate holder and copy holder being dimensioned to accommodate respectively a plate 30 and copy 28 up to a size of approximately three feet square.

The dimensions referred to illustrated the fact that a commercial camera embodying the invention can be quite sizable and massive. Yet, in order to achieve the fidelity and precision desired in the production of photographic images of copy, it is necessary that the major components of the camera which effect its performance be maintained in precise relations to each other while being movable in relation to each other in highly complex relative patterns of movement designed to continuously maintain a sharp focus in the image as it is varied in size and to maintain a constant light intensty in the image as it is enlarged or contracted.

In the camera 20 constructed in accordance with the invention, major components are moved with precision in complex predetermined patterns in relation to each other and are sturdily supported with precision in all positions of relative adjustment by means of a construction well adapted for economical manufacture and marked by a high order of serviceability and dependability which will continue over a long service life of heavy usage of the camera.

The working parts of the camera are supported on a horizontal base or bed 40 extending substantially the full length of the camera. The bed 40 has the simple shape of a relatively wide channel having two side flanges 42, 44, FIG. 8, extending longitudinally along opposite sides of the channel and extending upwardly from a flat, central plate portion 46 of the bed.

The upper edges of the flanges 42, 44 of the simple channel shaped bed 40 define two parallel support tracks 48, 50, FIGS. 1, 2 and 8, for a plurality of simple carriages used in supporting basic components of the camera and producing the coordinated movements of major camera components in relation to each other.

As shown in FIG. 1, the bed 40 rests on two longitudinally spaced transverse supports 52, 54 and, despite its fourteen foot length and its relatively small mass, the bed maintains the tracks 48, 50 perfectly straight, even under load, because of the inherent stiffness and resistance to bending resulting from the construction of the bed.

The plate holder 22 is fixedly mounted on one end of the bed 40 and extends upwardly from the bed in perpendicular transverse relation to the tracks 48, 50. The plate holder end of the camera is fitted into an opening 56 in one wall 58 of a photographic dark room 60, suitable masks 62 being connected between the camera and the wall 58 to exclude extraneous light from the dark room into which the operator gains entrance through a door, not shown. The plate holder 22 itself has a suitable construction, requiring no description here, which provides to a person in the dark room 60 access for mounting a typical photographic plate 30 in the plate holder and subsequently removing the exposed plate from the plate holder.

The copy holdler 24 and the lens holder 32 are moved along the bed 40 in relation to the plate holder 22 and simultaneously in relation to each other in a complex coordinated pattern of relative movements previously referred to. These movements together with automatic control of the lens 26 to maintain a constant level of light intensity in the image are produced and precisely coordiated by two parallel shafts 66, 68 that extend longitudinally along the full length of the bed 40 in parallel relation to the tracks 48, 50.

The two shafts 66, 68 are caused to rotate in precise synchronization with each other by a stationary transmission 70 mounted on one end of the bed 40.

The single control 36, previously referred to as being used to effect a progressive increase or decrease in the size of the image, is more particularly a manually rotatable hand wheel connected directly to the dark room end of the shaft 66, FIGS. 2, 6, 11 and 12, so that the shaft 66 can be rotated directly by an operator in the dark room 60. The transmission 70 is mounted on the end of the bed 40 opposite from the dark room 60 and comprises a plurality of herringbone gears intermeshing with each other and connected positively to the shafts so that the shafts are forced to rotate in precise positive synchronization with each other without backlash or lost motion of any kind which would create inaccuracy or uncertainty in the desired rotary synchronization of the shafts.

As shown in FIG. 5, the transmission ends of the shafts 66, 68 are journalled in bearings 72, 74 in an end plate 75 fixed to and extending transversely across the transmission end of the bed 40. The transmission 70 includes a herringbone gear 76 fixed to the outboard end of the shaft 66, which projects somewhat beyond the bearing 72, and meshing with a larger herringbone gear 78, FIGS. 5 and 10, secured to the outboard end of the shaft 68 which projects through the bearing 74.

The shaft 66 has a cylindrical form overall and is machined to define in its exterior surface a helical cam groove 80, FIGS. 1, 5 and 9, extending along substantially the entire length of the shaft 66 and having a constant and unvarying lead throughout its length, the lead being preferably one inch. For brevity of description, the helical cam groove 80 will be referred to simply as a "cam," which for convenience will be referred to more particularly as the "main cam." Similarly, the shaft 66 will be referred to as the "main cam shaft."

The main cam 80 is employed to produce longitudinal movement along the bed 40 of two cam carriages 82, 84 of similar construction, FIGS. 1, 5, 6 and 8, that are used in producing the desired movements of the copy holder 24 and the lens holder 32, respectively. For convenience in description, the cam carriages 82 and 84 will be referred to respectively as the "copy holder cam carriage" and the "lens holder cam carriage."

Each of the cam carriages 82, 84 is designed to serve as a carrier for a secondary cam which is used in producing a motion that is algebraically cumulative with other motions produced by rotation of the shafts 66, 68 and used in adjusting the image size while maintaining the image in sharp focus.

Since the two cam carriages 82, 84 are basically similar in construction, attention can be concentrated first on the copy holder cam carriage 82 illustrated best in FIGS. 1, 5 and 8. The carriage 82 serves as a carrier for the secondary cam 86, FIG. 5, which is rotatable about an axis parallel to the tracks 48, 50.

The secondary cam 86 is designed and constructed so that the traveling structure required in the operation of the cam 86 is confined essentially to the cam carriage 82, which can be of rather simple construction, and to simple yet effective bearing means mounted on the carriage 82 and coacting with the cam 86 to journal the cam 86 for rotation about an axis parallel to the tracks 48, 50, and transmit thrust between the rotary cam 86 and the carriage 82, so that axial movement of the rotary cam 86 in relation to the carriage 82 is precluded.

The secondary cam 86 is formed in the external surface of an elongated, hollow cam sleeve 90 having a cylindrical form overall. Rotary support is provided to opposite ends of the simple cam sleeve 90 by two flanged sleeve bearings 92, FIGS. 5 and 9, which serve to hold the sleeve in an exact longitudinal position in the cam carriage 82. Each sleeve 90 is fitted in the carriage 82, as shown in FIG. 9, and rotatably supports a journal 94 that receives the drive shaft 68 and has a radial thrust bearing 98 fitted between the adjacent end of the sleeve 90 and an opposing radial thrust bearing 100 on the sleeve 90.

The bearings 92 and journals 94, FIG. 5, coacting with opposite ends of the cam sleeve 90 are identical but are turned end-for-end in relation to each other to hold the cam sleeve 90 against axial displacement relative to the carriage 82, while allowing free rotation of the cam sleeve 90 around its longitudinal axis. The journals 94 provide radial support to the shaft 68 and hence to the adjacent ends of the cam sleeve 90.

Even though the two bearings 92 cooperate with the cam sleeve 90 to effectively obviate significant axial play of the sleeve 90 with reference to the carriage 82, it will be noted that the sleeve 90 always exerts a thrust reaction in the same direction with reference to the carriage 82, and hence always applies a thrust load on the same one of the bearings 92 when the control 36 is rotated either to enlarge the image when an enlargement is being produced or to reduce the size of the image when an image of reduced size is being produced, the enlargement and reduction referred to both being in relation to the size of the copy.

The cam sleeve 90 is centrally bored longitudinally to have a close sliding fit with the previously mentioned drive shaft 68 which extends longitudinally through the cam sleeve 90, as illustrated in FIGS. 5, 8 and 9. The drive shaft 68 has a drive surface 102, FIGS. 8 and 9, that extends longitudinally along the shaft 68 and cooperates with the cam sleeve 90 to transmit rotary movement of the drive shaft 68 to the cam sleeve 90. In the preferred construction illustrated, the shaft 68 has a square shape in transverse section, FIG. 8 and is received within a close fitting square bore 104 extending longitudinally through the sleeve 90. The flat side surfaces of the square shaft 68 form four sleeve drive surfaces 102 of the character referred to which fit co-mating internal surfaces in the square bore 104 to cause the sleeve 90 to continuously conform to the instantaneous rotary position of the shaft 68.

Structurally, the cam carriage 82 itself comprises a sturdy, yet simple, skeleton frame 106, FIGS. 5, 8 and 9, consisting essentially of two sturdy end members 108, 110 disposed in transverse relation to the tracks 48 and 50 and rigidly connected in spaced relation to each other by two longitudinal side plates 112, 114 and a central top plate 116. The frame 106 can be produced as a casting or as a weldment, as desired.

The two support bearings 92 for the cam sleeve 90 are fitted in the transverse members 108, 110 of the cam carriage 106, as illustrated specifically for one bearing 92 in FIG. 9.

Wheeled support for the cam carriage 82 is provided by four wheels 120 journalled on four stub axles 122 fixed to and cantilevering outwardly from the four corners of the carriage frame 106, as shown in FIGS. 4, 5 and 8. The four wheels 120, only two of which appear in FIG. 5, rest on and roll along the tracks 48, 50 to provide firm support for the carriage 82 on the bed 40 in a manner which provides for travel of the carriage 82 along the bed 40 in a path precisely parallel to the previously mentioned shafts 66, 68.

The cam carriage 82 is translated along the tracks 48, 50 by the constant lead main cam 80 to a degree that is a linear function of rotary displacement of the main cam 80 formed on the shaft 66. This action is effected by the coaction of the main cam 80 with a cam follower 126 carried by the carriage 82. The cam follower 126 is movably supported on the carriage 82 and is constructed in such fashion that it and the main cam 80 will operate together over a long service life to obviate lost motion between the carriage 82 and the cam shaft 66 along the axis of the shaft 66 and cause the carriage 82 to respond to rotation of the shaft with translation of the carriage 82 to a degree which conforms precisely to the degree of rotation of the shaft 66.

More particularly, the construction of the cam follower 126 is such that the cam follower provides in conjunction with the cam 80 a great fidelity of response of the cam follower to rotation of the helical cam 80, while at the same time effectively eliminating wear and erosion of the cam 80 and follower 126 in use. A long service life of these coacting parts is provided by a construction which distributes the forces of the cam 80 on the follower 126 over extensive mutually coacting surfaces on the cam follower to the end that the pressure stresses on these surfaces are limited to a low value conducive to long service life.

As can be visualized with reference to FIG. 9, the cam follower 126 defines a plurality of threaded projections 128 designed to fit closely in successive convolutions of the helical cam 80 and extend individually approximately half way around the main cam shaft 66. The thread elements 128 project from a concave semicylindrical face 130 formed by the cam follower 126 to conform to the adjacent exterior surface of the main cam shaft 66 and extend along the cam shaft for a length approximately equal to three times the lead of the helical cam 80. Three thread elements 128 extend from the face 130 into three successive convolutions of the cam 80 and reach approximately half-way around the shaft 66 when the follower 126 is in its cam engaging position shown in FIG. 9. The combined surface areas of the three segmental thread elements 128 thus formed provide the extensive cam following areas previously referred to which simultaneously confront surfaces of successive convolutions of the cam 80 to minimize the pressure forces on the relatively slidable surfaces and effectively eliminate wear. For convenience, cam opposing surfaces on the threads 128 are identified by the number 132, FIG. 9.

The cam follower structure thus formed is fashioned as an integral part of a swingable lever 134, FIGS. 5, 8 and 9, swingably mounted on a pivot shaft 136 that extends longitudinally between the carriage frame members 108, 110. The lever 134 of which the follower 126 is a part is urged upwardly away from the cam shaft 66 by a helical torsion spring 138, FIG. 9, anchored to the shaft 136 and acting on the lever 134.

The lever 134, FIG. 8, is swung downwardly, to engage the cam follower 126 with the cam 80, by means of an overcenter holddown lever 140 fixedly mounted on a rotary support shaft 142, FIG. 9, parallel to the support shaft 136 and swingably supported in a boss 144 depending from the underside of the central carriage frame plate 116 and in the transverse carriage frame member 110.

A handle 146, FIGS. 5 and 8, connected to the copy holder end of the shaft 142, which projects beyond the carriage frame 106, is used to swing, by rotating the shaft 142, the lever 142 between the cam follower engaging position shown in FIGS. 8 and 9, in which a roller 148 on the lever 140 holds the cam follower 126 in engagement with the cam 80, and a cam follower releasing position (not shown) in which the lever 140 is swung upwardly allowing the spring 158 to swing the cam follower 126 upwardly out of engagement with the cam 80. Rotary movement of the lever 140 is limited by coaction of a pin 150 with two angularly spaced limit stops 152, 154, FIG. 8, formed on a collar 156 fixed to the lever support shaft 142. The stop 152 is located so that in swinging the cam follower 126 into its cam engaging position, the lever 140 moves slightly past its overcenter position with respect to the lever 134 and shaft 142 to reach its normal cam follower engaging position where it is retained by the reaction of the spring 138.

The secondary cam 86, which is translated along the tracks 48, 50 as described, is itself used in translating along the tracks 48, 50 a wheeled copy holder carriage 160, FIGS. 1 to 5, 8 and 9, which supports the copy holder 24 and translates the copy holder along the tracks 48, 50, while continuously maintaining perfect alignment of the copy holder with the lens 26 and plate holder 22, the copy holder carriage 160 and the supported copy holder 24 being translated along the tracks 48, 50 to a degree which is the algebraic sum of motions produced by the main cam 80 and the secondary cam 86 operating in perfect synchronization produced by the previously mentioned stationary transmission 70.

Structurally, the copy holder carriage 160 comprises a generally flat frame 162, FIGS. 1, 8 and 9, supported at its four corners by two pairs of flanged wheels 164 that rest on and roll along the two parallel tracks 48, 50, as illustrated. The wheels 164 are journalled on short axles 166 carried by four similar wheel support brackets 168 secured to the underside of the frame 162. Spacers 170 fitted between the wheels 164 and brackets 170 obviate end play of the flanged wheels 164 relative to the brackets 168 so that engagement of the four flanged wheels 164 with the tracks 48, 50 and with the adjacent outboard surfaces of the bed flanges 42, 44, which may be regarded as components of the respective tracks 48, 50, assures at all times maintenance of a fixed angular relationship of the supported copy holder 24 in relation to the tracks 48, 50, as the carriage 160 and copy holder 24 are translated along the tracks.

The copy holder carriage 160 is positioned along the tracks 48, 50 by a cam follower assembly 172 removably mounted in the carriage frame 162 for coaction with either the secondary cam 86 described, or with another secondary cam mounted in the cam carriage 82 for use when a lens of different focal length is mounted in the camera, as will be described.

The cam 86 is formed by a groove (which for convenience is denoted by the same reference number) formed in the exterior surface of the cam sleeve 90. The cam 86 has a generally helical form modified so that the lead of the cam 86 progressively decreases along the sleeve 90 from the copyholder end of the sleeve toward the plate holder end of the sleeve, as shown most clearly in FIG. 5. The progressively varied lead of the cam 86 is determined in relation to the constant lead of the main cam 80, the gear ratio of the gearing 76, 78 which synchronizes the shafts 66, 68, and the focal length of the lens 26 being used to produce the desired change in image size, together with continuous maintenance of a sharp focus in the image. From the optics involved, including the factors just mentioned, a person skilled in the art can produce a cam 86 having the progressively varying lead required.

The cam follower assembly 172 is supported by a generally cylindrical vertical barrel 174 outwardly flanged at its upper end and threaded to fit into a threaded bore 176 formed on the carriage frame 162 and extending down through an underlying protuberance 178 on the carriage frame. A plunger 180 slidably fitted in a bore 182 in the lower end of the barrel 174 projects downwardly below the barrel and defines a transverse cam engaging protuberance or cam following element 182 that projects into the groove forming the secondary cam 86.

The plunger 180 is urged downwardly to firmly hold the cam following element 184 in the cam groove by means of a helical compression spring 186 acting on the upper end of the plunger 180 and contained within a counterbore 188 in the barrel 174. Since the lead of the secondary cam 86 progressively changes, the transverse cam following element 184 on the plunger 180 rotates somewhat as the element 184 travels along the cam. Rotation of the spring 186 with the plunger 180 is facilitated by an antifriction thrust bearing 190 mounted in the upper end of the barrel 174 and providing for free rotation of a seat 192 for the upper end of the spring 186.

It is fitting to mention that, if desired, the cam following element 184 can be designed to have a bullet nosed form that is circular in transverse section and shaped to fit into the cam groove 86. The transverse cam following element 184, illustrated is designed to track the cam 86 as it progressively changes in lead, while at the same time providing relatively extensive areas of mutual contact between the follower 184 and the cam 86.

Temporary disengagement of the cam following element 184 from the cam 86 is provided by a release knob 194 connected to the upper end of a stem 196 that is fastened at its lower end to the plunger 180 and extends upwardly through the spring 186 beyond the upper end of the barrel 174, as shown.

For convenience in illustration, the cam following assembly 172 is shown in FIG. 8 mounted in association with a secondary cam to be described, the position occupied by the cam following assembly 172 when cooperating with the cam 86 being illustrated in phantom in FIG. 8.

As previously indicated, the lens holder cam carriage 84, FIGS. 1, 3 and 6, is generally similar in construction to the copy holder cam carriage 82, previously described. Thus, the lens holder cam carriage 84 comprises a frame 200 supported on the tracks 48, 50 by four corner wheels 202 for translation along the tracks in parallel relation to the shaft 66, 68.

A secondary cam sleeve 204, identical to the previously described secondary cam sleeve 90, is rotatably supported in the lens holder cam carriage 84 in the same manner that the secondary cam sleeve 90 is journalled in the copy holder cam carriage 82, as described. The cam sleeve 204 defines a secondary cam 206 which is identical to the previously described secondary cam 86, the lead of the cam 206 progressively decreasing in the direction of the plate holder 22, as does the lead of the secondary cam 86.

Moreover, the secondary cam sleeve 204 in the carriage 84 slidably receives and is rotatably positioned by the drive shaft 68 in the same manner that the cam sleeve 90 previously described is related to and positioned by the same shaft 68.

A main cam follower 210, identical in all material respects to the previously described main cam follower 126 mounted on the copy holder cam carriage 82, is swingably supported on the lens holder cam carriage frame 200 in generally the same manner as the main cam follower 126 is supported on the copy holder cam carriage frame 106, as described.

The lens holder 32 is mounted on a lens holder carriage 212 that is basically similar in construction to the previously described copy holder carriage 160, the lens holder carriage comprising a generally flat rectilinear frame 214, FIGS. 1, 3 and 6, supported on the tracks 48, 50 by flanged wheels 216 that cause the lens holder carriage 212 and the lens holder 32 mounted thereon to move along the tracks 48, 50 with a pure translatory motion.

As previously indicated, the copy holder 24 and the lens holder 32 are mounted on the copy holder carriage 160 and the lens holder carriage 212, respectively, and extend upwardly from the respective carriages in perpendicular transverse relation to the tracks 48, 50. The camera 20 is designed to use more than one lens interchangeably, and for this reason the lens holder 32 is centrally adapted to support interchangeably different selected lens assemblies, to be described.

In the camera 20 shown, the two secondary cams 86, 206 carried by the respective cam carriages 82, 84 are designed for use in producing either enlarged or reduced photographic images when a lens having a focal length of nineteen inches is mounted in the lens holder 32, such a lens being identified by the number 26, previously mentioned. As will be described presently in greater detail, both of the secondary cams 86 and 206 are employed simultaneously in reproducing photographic images of reduced size in relation to the size of the copy.

As previously described, the cam follower assembly 172 is mounted in the copy holder carriage 160 in coaction with the cam 86 to effect controlled translation of the copy holder 24 upon rotation of the cam 86. A cam follower assembly 220, similar in construction to the cam follower assembly 172, is removably mounted in the plate holder end of the lens holder carriage 214 in overlying coacting relation to the cam 206, for engagement with the cam 206 for translation of the follower assembly 220 and the lens holder carriage 212 along the tracks 48, 50 upon rotation of the cam 206.

As previously indicated, the lens having a focal length of nineteen inches in used to produce images of reduced size and image enlarged to four hundred percent of the size of the copy. To produce images enlarged to a greater degree, the nineteen inch focal length lens is replaced by the lens having a focal length of twelve inches.

With the twelve inch focal length lens mounted on the lens holder 32, the action of the camera is controlled with the aid of a second variable lead cam 222 formed on the external surface of a cylindrical cam sleeve 224, FIG. 5, journalled on the copy holder cam carriage 82 in the same manner that the first described cam sleeve 90 is journalled on the carriage 82. In the preferred construction illustrated, the cam sleeves 90 and 224 are disposed on opposite sides of the main cam shaft 66 in parallel relation to each other. To use the cam 222, the cam follower assembly 172 is removed from the copy holder carriage bore 176, FIG. 8, and transferred to a similar threaded bore 226 formed in the copy holder carriage in overlying relation to the cam sleeve 224 so that the follower element 184 engages the cam groove 222, as indicated in solid lines in FIG. 8. As shown, the lead of the secondary cam 222 is different from that of the lead of the cam 86, FIG. 5, because of the difference in the focal lengths of the lenses with which the cams are used and differences in the relative speeds with which the cams 86 and 222 are rotated, as will appear.

The cam sleeve 224 is rotated by a third shaft 230, similar to the shaft 68 and journalled on the bed 40 in the same manner as the shaft 68. Thus, the shaft 230 is squared and drives the cam sleeve 224 in the same manner that the shaft 68 drives the cam sleeve 90, as described.

The shaft 230, and hence the cam 222, is turned in synchronism with the shafts 66 and 68, but at a speed reduced in relation to the speed of the shaft 68. This is effected by the stationary trasnmission 70 which includes, as illustrated in FIGS. 5 and 10, a herringbone gear 232 meshing with the previously mentioned herringbone gear 76 fixed to the shaft 66 and being materially larger than the gear 76. The gear 232 drives a smaller herringbone gear 234 in mesh with a much larger herringbone gear 236 fixed to the end of the shaft 230 which projects through a support bearing 238 in the bed plate 75.

The ratios of the herringbone gearing in the transmission 70 are such that the shaft 68 which rotates the cams 86 and 206 is turned through one half revolution for each revolution of the main cam shaft 66, and the shaft 230 which rotates the cam 222 is turned through one tenth of a revolution for each revolution of the main cam shaft 66.

As previously intimated, the light aperture, which is indicated symbolically by the dotted circle 240 in FIG. 13, of the camera lens 26 is progressively opened and closed in synchronization with rotation of the camera control 36, to maintain a constant light intensity in the image in the plane of the plate 30 as the size of the image is enlarged and reduced respectively. Automatic adjustment of the size of the lens aperture 240 in synchronization with progressive variation of the image size is produced by a special power train or transmission 242, FIGS. 1, 13 and 14, interconnecting a rotary control 244 with the longitudinal drive shaft 230. The lens aperture defining structure which controls and adjusts the size of the aperture 240 in response to rotation of the control 244 is of a conventional design requiring no description here.

The periphery of the circular lens aperture adjusting element 244 defines a worm gear 246 that meshes with a worm 248 journalled in a bracket 250, FIGS. 13, 14 and 15, fixed to a support plate 252 for the lens 26. The lens plate 252, together with the lens 26 and the worm 246 and gear 146 and coacting elements used in defining the lense aperture 240, form a lens assembly denoted generally by the number 254 which is adapted to be removably mounted as a unit on the vertical lens holder 32. The two lenses of different focal lengths referred to form component parts of similar lens assemblies 254 which are mounted interchangeably on the lens holder 32, as indicated.

The worm 248 is connected by two universal joints 256, 258 and an intervening drive shaft 259 with the output drive element 260 of a speed reducing transmission 262 mounted on the lens holder carriage frame 214 in overlying relation to the shaft 230, as indicated in FIGS. 6, 13 and 14.

The transmission 262 is driven by the shaft 230 by means of a bevel gear 264 having a squared internal bore 266 slidably receiving the shaft 230. An arcuate guide 268 carried by a depending bracket 270 secured to the carriage frame 214 fits into an annular groove 272 in the hub 274 of the gear 264, to cause the gear 274 to follow translation of the lens holder carriage 212 along the tracks 48, 50.

The bevel gear 264 meshes with a bevel gear 276 fixed to the lower end of a transmission input shaft 278 journalled in the carriage frame 214.

An upward extension 280 of the input shaft 278 is journalled in two vertically spaced support plates 282, 284 for gearing that provides for driving the output element 260 in different directions and at different speeds in relation to rotary movement of the input element 278 when the camera is used to produce enlarged images and images of reduced size, respectively.

When the camera is set to produce images of reduced size in relation to the size of the copy, a shiftable gear 286, FIGS. 13 and 16, mounted on the input drive extension 280 for rotation with the extension 280 and slidable movement along the extension 280, is shifted to an upper operating position illustrated in FIG. 13 in which the gear 286 meshes with a larger gear 288 fixed to the output element 260. The gear ratio of this drive is such that the output element 260 is turned at a speed one-half that of the input drive element 278.

When the camera is set to produce enlarged images, the shiftable gear 286 is moved downwardly from the position shown in FIG. 13, to cause the gear 286 to mesh with an idler gear 290 that meshes with a lower gear 292, FIGS. 13 and 16, fixed to the output element 260 below the gear 288. Because of the use of the idler gear 290, the direction of rotation of the output element 260 is reversed in relation to the direction of rotation of the input element 278.

In point of fact, the input element 278 and the output element 260 turn in the same direction when the drive is through the idler gear 290. The significant point is that shifting of the gear 286 reverses the direction of the output element 260 in relation to the direction of rotation of the input element 278. The gear 292 has a pitch diameter equal to that of the shiftable gear 286 so that when the drive is through the idler gear 290 the output element 260 turns at the same speed as the input element 278, rather than at one-half of the speed of the input element 278, as when the drive is through the gear 288.

The shiftable gear 286 is moved between the two operating positions by a shifting spool 294 supported on a vertical shifting stem 296 slidably mounted in the plates 282, 284 for longitudinal shifting movement by a knob 298 on the upper end of the stem 296 to either of the two operating positions of the stem 296 in which the stem 296 is releasably held by a spring biased detent 300.

The mode of operation of the automatic lens control drive thus described will be presently reviewed in relation to the overall action of the camera.

The character of the camera 20 is such that the duties of the operator are reduced to very simple and easily performed manual operations requiring only rudimentary training and the exercise of virtually no judgment.

The copy 28 to be photographed is placed in the copy holder 24 which comprises a simple, generally flat frame 302, FIGS. 1, 3, and 4, equipped with suitable means requiring no description here for supporting the copy 28 in a flat position in the frame. Such copy support structure can be readily provided by those skilled in the art.

However, loading of the copy in the frame 302 is facilitated by a pivotal support 304 for the frame 302 which provides for easy swinging movement of the frame 302 from its normal vertical position, illustrated in FIGS. 1 and 3, to the horizontal position, illustrated in FIG. 4, for loading of the copy 28. With the frame 302 swung to the horizontal position of FIG. 4, the copy 28 is placed flat on a translucent support plate, represented by the dotted line 306, forming a part of the support frame 302. After the copy 28 is secured in place, the frame 302 is swung back to its normal vertical position for photographing the copy.

The copy 28 is lighted for photographing with light having a predetermined constant light intensity that is maintained throughout adjustment of the camera to vary the size of the image. Light of a predetermined intensity is applied constantly to the copy when desired by either of two light sources, both of which are mounted on the copy holder carriage 160 to have at all times a fixed positional relationship to copy supported in the copy holder 24. One light source is used for front lighting of copy of such character that it is desirable to apply light from the lens side of the copy.

In the preferred construction illustrated, this light source is formed by a plurality of electric light bulbs 310, FIG. 4, mounted in a pair of normally vertical light reflectors 312 mounted by swingable brackets 314 on opposite sides of the copy support frame 320. The reflectors 312 and bulbs 310 remain continuously in predetermined fixed positions in relation to the position in which copy 28 occupies in the frame 302, except as the reflectors 312 together with the bulbs 310 may be swung out of the way by the brackets 314, to facilitate loading of copy 28 when the frame 302 is turned to its horizontal copy loading position. It may be noted that electric power is supplied to the light bulbs 310 through a socket 316 on the frame 302 and a coacting power supply plug mounted on the copy holder support carriage 160 so that the socket 316 separates from the plug 318 upon swinging of the frame 302 to its horizontal copy loading position, FIG. 4, and automatically reconnects with the plug 318 upon return of the copy holder frame 302 to its normal vertical position, FIG. 1.

A second light source for copy mounted in the frame 302 is formed by an electric bulb and reflector assembly 320, FIGS. 1, 2 and 4, supported on the copy holder carriage 160 by brackets 322, so that the bulb and reflector assembly 320 is disposed at the side of the normal position of the copy holder frame 302 opposite from the lens 26 and spaced from the frame 302 to direct light through the translucent copy support 306 and the copy 208. Light from the bulb and reflector assembly 302 is used when photographing transparencies or other copy where light through the copy is desired.

It should be appreciated that the spacing of all light sources from the copy remains constant, and that the intensity of the light applied from either light source remains constant as the carriage 160 and copy 28 is traversed along the tracks 48, 50.

In commercial use of the camera 20, the normal practice would be to program the work so that a number of photographing operations would be performed using the same one of the two lens assemblies 254, previously described in relation to FIG. 13, the lens of a focal length of nineteen inches being used for producing both enlargements and reductions, and the lens assembly including the lens of twelve inch focal length being substituted into the lens holder 32 when enlargements in excess of four hundred percent are desired.

Assuming that either enlargements or reductions are desired, the lens assembly having the lens of nineteen inch focal length is mounted on the holder 32 and the worm 248 of the assembly is connected with the lens control drive shaft 259, FIGS. 2 and 14. It should be mentioned at this point that suitable provision is made for detachably connecting the worm 248 with the lens control drive shaft 259. The two cam carriages 82, 84, the copy holder carriage 160 and the lens holder carriage 212 are all set to starting positions for the nineteen inch lens. This operation is achieved very quickly in a very simple manner requiring no particular skill and virtually eliminating chances for error.

The lens holder cam carriage 84 is moved toward the plate holder 22 to a starting position illustrated in FIGS. 3 and 6. The carriage 84 is latched in this position at least temporarily by a latch 324 mounted by the pivot 326 on the bed 40. The latch 324 is moved into engagement with the frame 200 (shown in phantom lines in FIG. 2) on the carriage 84 by operation of a latch lever 328 that moves an eccentric cam 330, FIG. 6, in a slot 332 of a cam follower 334 slidably mounted in a bracket 336 on the bed 40, as shown in FIG. 6, and connected by a link 338 with the latch lever 324.

A bracket 340 swingably mounted on the bed 40, as shown in FIGS. 2 and 3, and supporting a preadjusted abutment stop 342 for the copy holder cam carriage 82 is swung from an inoperative position out of the path of the cam carriages into an operative position in which the abutment stop 342 confronts and lies in the translational path of the frame 106 of the copy holder cam carriage 82.

After the abutment stop 342 is simply swung into its operative position, the copy holder cam carriage 82 is moved toward the plate holder 22 until the copy holder cam carriage 82 is stopped in its "starting" position by engagement of the copy holder cam carriage frame 106 with the locating abutment stop 342, as shown in FIG. 3. To permit free translation of the copy holder cam carriage 82 into engagement with the stop 342, the previously described main cam follower 126 on the copy holder carriage 82, FIG. 9, is released from the main cam 80 by manual swinging movement of the cam follower control lever 146, FIG. 8, as previously described.

The main cam 80 is rotated until indicator means 346, FIGS. 1, 11 and 12, which continuously register the precise rotary position of the cam 80, is set to a starting position in which the position of the cam 80 as registered by the indicator means 346 corresponds precisely to a value which is precisely equal to the focal length of the lens 26 mounted on the lens holder 32, as will be explained presently in greater detail. With the copy holder cam carriage 82 moved to its starting position and the cam 80 turned to its starting position as registered by the indicator means 346, the cam release to be described, the cam release control lever 146 is operated to set the main cam follower 126 back into engagement with the main cam 80, whereupon the abutment stop 342 can be swung back to its inoperative position.

While the main cam 80 remains in its starting position, the cam follower assembly 172 is mounted in the bore 176, FIG. 8, of the copy holder carriage frame 162 to overlie the secondary cam 86. The operator lifts up the knob 194 to hold the cam engaging element 184 out of engagement with the cam 86 and moves the copy holder carriage 160 away from the plate holder 22 until the cam engaging element 184 is aligned with the convolution of the cam 86 most remote from the plate holder 22, whereupon the spring 186 is allowed to engage the follower element 184 with the cam 86, thereby locating the copy holder carriage 160 in its starting position.

With the lens holder cam carriage 84 located in its starting position by engagement of the latch lever 324 with the lens holder cam carriage frame 200, as previously described, FIG. 6, the lens holder carriage 212 is located in its starting position in either of two ways, both simple, depending upon whether or not the operator desires to produce images which are reduced or enlarged in relation to the copy size. The two ways of locating the lens holder carriage 212 in its starting position are equally effective for producing images having a size equal to that of the copy.

Assuming that the operator desires to produce images of reduced size in relation to the copy size and that the lens holder cam carriage 84 has been located in its starting position by engagement of the latch 324, the lens holder carriage 212 is translated (if necessary) so that it occupies the position illustrated in FIG. 3 in which the lens holder carriage 212 is shifted away from the plate holder in relation to the lens holder cam carriage 84. The previously described cam follower assembly 220, FIG. 6, is then fitted into its mounting position on the plate holder end of the lens holder carriage frame 214, and the lens holder carriage 212 is adjusted as necessary to cause the cam follower assembly 220 to engage the underlying convolution of the cam 206 which is most remote from the plate holder end of the cam sleeve 204. The main cam follower 210 on the lens holder cam carriage 84 is allowed to remain out of engagement with the main cam 80. The action which ensues in producing images of reduced variable size will be described presently.

If, on the other hand, the operator desires to produce images of enlarged size, the lens holder carriage 212 is moved to its same starting position in relation to the lens holder cam carriage 84 illustrated in FIG. 3, but the cam follower assembly 220 is left out of its operative position in relation to the cam 206, and the lens holder carriage 212 is locked in its starting position in relation to the lens holder cam carriage 84 by means of a locking plunger 350, slidably mounted in an upwardly extending barrel 352 fixed to the copy holder end of the lens holder frame 214, FIGS. 6 and 7. The locking plunger 350 is urged downwardly by a helical compression spring 354 acting between the top of the plunger 350 and a spring seat 356 within the barrel. The plunger 350 is moved upwardly against the spring 354 into an inoperative position by a knob 358 connected to the upper end of a retracting stem 360 extending from the plunger 350 up through the top of the barrel. A transverse pin 362 projecting from opposite sides of the stem 360 rests on top of the barrel 352 to hold the plunger 350 in its retracted position.

To lock the lens holder carriage 212 in its starting position in relation to the lens holder cam carriage 84 as recited, the knob 358 is rotated ninety degrees allowing opposite ends of the pin 362 to enter clearance slots 364 in the upper end of the barrel 352, whereupon the spring 354 moves the plunger 350 downwardly into an underlying bore or receiver 366, FIG. 6, formed in the lens holder cam carriage frame 200.

The main cam follower 210, swingably supported on the lens holder cam carriage 84 as described, is moved downwardly into coacting engagement with the main cam 80 by means of a cam engaging lever 368, FIG. 6, connected with a rotatable cam engaging shaft 370 journalled in supports 372 on the underside of the lens holder carriage frame 214. A cam engaging lever 374 fixed to the shaft 370 swings the cam 210 downwardly into engagement with the main cam 80 in response to actuation of the control handle 368. The construction of the cam engaging lever 374, the manner in which it is mounted on the rotatable control shaft 370, and the manner of coaction of the lever 374 with the cam 210 to engage and to effect release of the cam 210, is generally similar to the construction, support and mode of operation of the previously described cam control lever 140, carried by the copy holder cam carriage 82 and coacting with the other main cam follower 126. The handle 368, shaft 370 and lever 374 are carried by the lens holder carriage 212 rather than by the lens holder cam carriage 84, to continuously provide convenient access to the manual control handle 368, but the relationship of the parts is such that the lever 374 overlies the cam follower 210 when the lens holder carriage 212 is in its starting position in relation to the lens holder cam carriage 84 where it is locked in engagement of the plunger 350 with the receiver 366, as described, for producing enlarged images.

When the copy holder 224 is set to its starting position and the lens holder 32 is set to its starting position in either of the two ways described, the spacing of the optical center of the lens 26 from the plane of the copy 28 is equal to the spacing of the optical center of the lens from the plane of the plate 30, each of these spacings being precisely equal to twice the focal length of the lens being used, by virtue of the dimensions and positions in relation to each other of the parts described which are used in locating the copy holder and the lens holder in their starting positions.

In using the camera 20 to produce images of either enlarged size or reduced size, the control 36 is turned in the same direction, both to increase the degree of image enlargement, when enlarged images are being produced, and to increase the degree of reduction when reduced images are being produced. Here as elsewhere in the description "enlarged" and "reduced" images are denominated in relation to image size relative to copy size.

The rotation of the control 36 which increases the image size in enlargement moves the copy holder 24 away from the plate holder 22. Similarly, rotation of the control 36 in the same direction to increase the degree of reduction of the image size in reduction moves the copy holder 24 away from the plate holder 22 in the same manner as when the size of the image is being increased in enlargement. Moreover, the degree to which the control 36 is turned to produce a desired degree of change in the image size is the same both in producing images of enlarged size in relation to the copy size. The degree to which the size of the image is to be varied is determined by the relationship of the larger to the smaller of the copy size and the desired image size in both enlargement and reduction.

The manner in which the rotary control 36 is set to the same position to produce a particular desired degree of enlargement and the same particular desired degree of reduction can be readily visualized with the aid of an example. Suppose the operator desires to produce from a copy having a horizontal dimension of 30 inches, for example, a photographic image having a similar dimension of 7.5 inches. In this assumed example for producing an image of reduced size, the size of the image differs from the size of the copy by a factor of precisely "4," which factor is determined by dividing the smaller into the larger of corresponding dimensions of the copy and the image. It should be understood that any linear dimension can be used in this simple calculation, so long as corresponding dimensions for the copy and image are used, the smalled dimension being divided into the larger dimension.

In our assumed example, the factor of "4" by which the image to be reduced in size in relation to the copy size is multiplied by a constant which is the precise focal length of the lens being used determined to five significant figures. The nineteen inch (focal length) lens mounted in the camera may have, for example, a precisely determined focal length of 18.996 inches. This precise focal length is predetermined optically, and is used repeatedly by the operator in a simple step of multiplication which is to multiply this five digit constant by the factor to which the image size is changed in relation to the copy size.

In our assumed example, the factor of "4" by which the image size is reduced in relation to the copy size is multiplied by the focal length of the lens in inches, to wit: 18.996 to obtain a five digit product, to wit: 75.984.

As will be described, the operator turns the control 36 and hence the shafts 66, 68, and 230 connected together by the gearing 70 to positions corresponding precisely to the readily determined product value recited, i.e. "75.984." The manner in which this precise setting is made will be described presently in detail. The camera by virtue of its construction is capable of determining the size of the image with an accuracy commensurate with the exactness of the five digit product mentioned by way of example.

As a counterpart of the just discussed example of a reduction, let us assume that an operator desires to produce from a copy having a particular linear dimension of six inches an image having a corresponding dimension of twenty-four inches, an enlargement of copy size to image size by a factor of "4," a factor identical to that by which the image size is related to the copy size in the example of reduction just discussed. In our assumed example of enlargement, the operator multiplies the factor of enlargement, i.e., "4," by the focal length of the image, 18.996, to obtain the same product, to wit: 75.984.

To produce the enlargement of the six inch copy to the twenty-four inch copy, the operator sets the position of the control 36, as indicated by the indicator means 346, to be described, to the same position that the control 36 is set to product the reduction of the 30 inch copy to the 7.5 inch image, as in the first example. It may be observed at this point that the dimension units by which the size of the copy and the size of the image are measured are of no consequence, since the important consideration is the factor by which the corresponding dimensions of the copy and image are related to each other.

Not only is the same setting of the control 36 used to produce the same degrees of image enlargement and reduction using the same lens, but the same simple mode of multiplication is used to determine the setting of the control 36 to produce different degrees of enlargement and reduction using a lens of different focal length, the mode of determining the setting of the control 36 indeed being applicable to use of the camera having a lens of any focal length.

Accurate setting of the image varying control 36 to positions corresponding to the product of the focal length of the lens and the factor by which the size of the desired image differs from that of the copy is made both precise and easy by the indicator means 346, previously referred to, which is so constructed that accurate reading of the indicator means even by an operator having no particular skill is virtually assured.

The indicator means 346 provided for this purpose comprises a first disk 380 fixed to the dark room end of the shaft 66 adjacent the manual control wheel 36, shown in FIGS. 6, 11 and 12. The periphery of the disk 380 defines a cylindrical edge 382 on which is inscribed a circular scale 384 having one thousand evenly spaced gradations 386. The disk 380 is made sufficiently large in diameter to provide between successive gradations 386 spacings adequate to enable the operator to clearly and quickly differentiate the successive gradations 386 from each other with the unaided eye, and to move any particular gradation 386 into registration with a reference line 388 on a transparent reference member 390 fixed to a transverse support plate 392, FIG. 6, on the dark room end of the bed 40 and cantilevering over the disk 380, as illustrated in FIGS. 6 and 11.

Reading of the scale 384 is facilitated by numbering of the gradations 386 at successive intervals of ten gradations each starting with zero and continuing successively all the way around the scale back to zero, as indicated in FIG. 11.

The constant lead of the helical main cam 80 previously described is precisely one inch. Hence, rotation of the main cam 80 through an angle equal to only one-thousandth of a revolution, which can be read easily along the circular scale 384 by reference to the line 388 in relation to the one-thousand gradations 386, is effective to produce translatory movement of each of the main cam followers 126, 210 through an increment of one-thousandth of an inch. The movements effected by the two secondary cams 86, 206 as an incident to the same movement of the control wheel 36 are equally precise.

Registration of rotary movement of the control wheel 36 is also recorded on a second disk 396, FIGS. 6 and 11, journalled on the shaft 66 between the first indicator disk 382 and the transverse support plate 392 mounted on the adjacent end of the bed 40. A cylindrical surface 398 on the periphery of the disk 396 defines a circular scale 400 marked by one hundred twenty equally spaced and successively numbered gradation 402. A simple yet precise drive is provided for rotating the second disk 396 through an angle equal to the angular spacing between successive gradations 402 each time the main shaft 66 turns through one complete revolution. Thus, the one hundred twenty equally spaced gradations 402 on the disk 396 provide for registering one hundred twenty turns of the main shaft 66, which of course provides for registering one hundred twenty inches or ten feet of movement of each of the main cam followers 126, 210, and hence ten feet of longitudinal movement of the copy holder cam carriage 82 and the lens holder cam carriage 84, respectively, along the tracks 48, 50.

The two indicator disks 380, 396, disposed in coaxial adjacent relation to each other, as described, are equal in diameter, thus facilitating quick reading of both of the scales 400 and 384 in relation to the common reference line 388 overlying the disks, as illustrated in FIGS. 6, 11 and 12.

The previously mentioned means which rotates the second indicator disk 396 in synchronism with the first disk 380 but at a speed of only one one-hundred-twentieth of that of the disk 380, comprises a first bevel gear 404 fixed to the dark room or plate holder end of the shaft 68 which is journalled in and projects through the transverse bed plate 392, as illustrated in FIGS. 11 and 12. The shaft 68 is rotated in synchronism with the shaft 66, but at only one-half the speed of the shaft 66 by the fixed herringbone gear transmission 70, previously described.

The bevel gear 404 on the reduced speed shaft 68 meshes with another bevel gear 406 fixed to an indicator drive shaft 408 journalled in a support bracket 410 secured to the transverse bed plate 392 between the plate 392 and the relatively slow moving indicator disk 398, as shown in FIG. 11. A worm 412 fixed to the indicator drive shaft 408 meshes with a worm gear 414 mounted on the hub 416 of the slow moving indicator disk 398, the worm 412 and gear 414 providing a 60-to-1 speed reducing ratio, so that the overall desired speed reduction in rotation of the second disk 396 is obtained.

It is fitting to direct attention to the fact that in setting the rotary control 36 to the product of the focal length of the lens and the factor by which the image is either reduced or enlarged in relation to the size of the copy, the control 36 is turned until that portion of the product previously referred to located to the left of the decimal point is read on the slow moving scale 400 in relation to the reference line 88. The setting is completed by rotation of the control 36 to produce a reading of the scale 384 with reference to the same line 388 which corresponds to the three numbers appearing to the right of the decimal point in the product corresponding to the desired size of the image to be produced. Thus, the operator can set the control 36 to the proper position by causing the control 36 to turn until the product referred to is read under the reference line 36 directly on the scales 400 and 384, the number to the left of the decimal point being read directly on the scale 400 and the number to the right of the decimal point being read directly on the scale 384.

As previously indicated, the copy holder 24 is moved away from the plate holder 22, both to increase the degree of image enlargement when producing an enlarged image, and to increase the degree of image reduction when producing a reduced image. However, the direction of movement of the lens holder 32 in relation to the plate holder 22 is different for increasing the degree of enlargement when enlarging and in increasing the degree of reduction when reducing the size of the image.

The mode of operation of the camera 20, thus described, can be visualized with reference to review of its operation to produce an enlarged image of enlarged size and a reduced image of desired size using a nineteen inch focal length lens assembly 254 mounted in the camera as described. The two cam carriages 82, 84, the copy holder carriage 160 and the lens holder carriage 212 are set to their starting positions, as described. The light aperture 240, FIG. 13, is set to its starting position and a connection made between the lens control worm 248 and the lens control transmission output shaft 260 made as described. The copy 28 is mounted in the copy holder 24 and one of the two light sources 320, 312 turned on, depending upon whether or not the copy is to be lighted from the black side or the front side.

As the cam carriages 82, 84 are moved to their starting positions, both of the main cam followers 126, 210 of the respective cam carriages are released from the main cam 80. With the cam carriages 82, 84 located in their starting positions, one or both of the main cam followers 126, 210 are reengaged with the main cam 80, depending upon whether or not images of reduced or enlarged size are to be made, such reengagement of the main cam followers being effected only after the control wheel 36 has been rotated to produce a reading on the scales 400 and 384 on the disks 396 and 380 which corresponds to five significant figures precisely to the predetermined focal length of the lens mounted in the camera, which focal length in the example given previously was "18.996." With the control 36 set in this manner and indicated by the indicator means 346, one or both of the main cam followers are reengaged, as described.

Assuming now that images of enlarged size are to be produced, the control knob 298, FIGS. 6 and 13, is shifted downwardly to cause the lens control transmission 262 to drive the worm 248 at the proper speed and in the proper direction for enlarging the lens aperture 240 as the image size is increased, thereby maintaining a constant light intensity in the image as desired.

It may be noted at this point that the setting of the size of the lens aperture 240 is adjusted to provide a desired light intensity in the image when the camera is in its starting position by manually rotating the worm 248 by a knob 430 connected to the upper end of the worm 248, as shown in FIGS. 13 and 14, the worm 248 being disconnected from the lens control transmission 262 when the lens aperture 240 is manually adjusted in this manner in starting position.

With the camera set up for enlargement in the manner described, the operator can produce any number of enlarged photographic images within the range of the lens used, the degree of enlargement of each image being controlled precisely by simple setting of the control 36 to produce the desired degree of enlargement, as read directly on the indicator dials 380, 396.

Rotation of the control 36 to increase the degree of enlargement of an image causes both the copy holder cam carriage 82 and the lens holder 32 to move in unison away from the copy holder 22, both main cam followers 126 and 210 being engaged, and the lens holder carriage 212 being locked to the lens holder cam carriage 84, as described. At the same time, the secondary cam 80 progressively moves the copy holder carriage 160 toward the plate holder 22 in relation to the copy holder cam carriage 82, but at a reduced speed in relation to the speed of movement of the copy holder cam carriage 82 away from the plate holder 22, so that the algebraic sum of the cam produced movement of the copy holder 24 is away from the plate holder 22 as the degree of enlargement is increased. To change the degree of enlargement requires merely that the control 36 be turned to a new position corresponding to the desired degree of enlargement, the light intensity on the image being kept constant for all degrees of enlargement, and the image being kept in perfect focus for all degrees of enlargement.

To produce images of reduced size, the operator has merely to return the camera to its starting position by rotation of the control 36 until the focal length of the lens is read on the indicator 346, whereupon the lens holder cam carriage 84 is latched in its starting position by operation of the latch control 328, the main cam follower 210 is released from the main cam 80, the cam assembly 220 is engaged with the secondary cam 206, and the lens holder carriage 212 is unlocked from the lens holder cam carriage 84, as described.

The lens control knob 298, FIG. 13, is pulled upwardly to reduce the relative output speed and reverse the direction of rotation of the output side of the lens control transmission 262, as described.

Thus, conditioning of the camera to produce reduced images rather than enlarged images consists of shifting from one position to another of only five simple manual controls, to wit: the latch lever 328, the main cam control lever 368, the lock release knob 358, the cam follower assembly 220, and the lens control transmission knob 298.

Reshifting of these same five controls is, of course, sufficient to condition the camera for producing enlargements after having been conditioned for producing reductions. Thus, the changeover of the camera from the production of enlargements to the production of reductions is a very simple procedure that can be performed with a modicum of training without the exercise of any particular judgment, as such.

With the camera set up to produce images of reduced size, the operator turns the control 36 to produce a reading on the indicator means 346 corresponding to the desired degree of image reduction. Rotation of the control 36 to increase the degree of image reduction causes the copy holder 24 to be progressively moved away from the plate holder 22 by the differential action of the main cam 80 and the secondary cam 86, as when the degree of enlargement is being increased. However, the lens holder cam carriage 84 is held stationary and the lens holder 32 is progressively moved toward the plate holder 22 by the variable lead cam 206 carried by the lens holder cam carriage 84 and being identical to the variable lead cam 86. It may be noted in this connection that the movements of the lens holder 32 and the copy holder 24 produced by the cams 206 and 86, respectively, are identical in sense and degree, so that the copy holder 24 is moved away from the lens 26 to a degree which is a linear function of the degree of rotation of the control 36.

As an aid to quick setting of the camera to produce successive images enlarged or reduced to different desired degrees, power means is provided for rotating the positively synchronized shafts 66, 68 and 230 to positions approximating the final desired position for producing each image, as indicated by the indicator means 346, the final position of the shafts being determined by manual rotation of the control 36 to produce the precise desired reading on the indicator means 346.

As shown in FIGS. 5 and 10, the power drive means provided for this purpose comprises an electric motor and speed reducing power assembly 440 mounted on the underside of the bed 40 below the transmission 70 and connected by a sprocket chain 442 with a sprocket gear 444 fixed to the adjacent end of the shaft 66 outwardly of the previously mentioned herringbone gear 76 secured to the shaft 66 and forming a part of the transmission 70 which is normally enclosed by a suitable cover 446, FIGS. 1 and 2. Control buttons 448, or other suitable electrical controls, are accessibly mounted on the dark room end of the bed 40 adjacent the control 36, FIG. 2, for energizing the electric motor assembly 440 to turn the shaft 66 and control 36 rapidly by power toward the next desired setting of the indicator means 346, as previously intimated. Final movement of the control 36 into the exact desired position is completed manually.

As previously stated, the lens having a focal length of nineteen inches is used to produce images having a size ranging from twenty-five percent to four hundred percent of the copy size. These limits on the degree of reduction and enlargement, respectively, stem primarily from limitations imposed by the inherent character of mechanical parts of the camera, particularly the bellows 34. There are finite limits on the degree to which the bellows can be compressed and extended, respectively. In the camera described, the twenty-five percent limit on reduction stems primarily from limitations on the degree to which the bellows 34 can be contracted, and hence limitations on the degree to which the lens 26 can be moved toward the photographic plate 30. The four hundred percent upper limit on enlargement stems primarily from practical limits chosen for the length of the camera illustrated. These limitations in camera length are determined by practical factors, including the degree to which the bellows 34 can be extended, while at the same time being contractable to provide the desired degree of reduction.

The range through which the size of the image can be varied in relation to the size of the copy is extended by mounting in the camera a lens of different focal length, as previously intimated.

Thus, to make enlargements, a lens assembly 254 incorporating a lens of twelve inch focal length is substituted into the lens holder 32 in place of the lens assembly incorporating a lens of nineteen inch focal length.

The procedure for setting up the camera to use the lens of shorter focal length is made quickly and easily by virtue of set up features incorporated into the camera.

To achieve proper positioning of the copy holder 24 and the lens holder 32 in relation to each other and in relation to the control 36 for the new lens, the two cam carriages 82, 84, the copy holder carriage 160 and the lens holder carriage 212 are all released for free movement along the tracks 48, 50. The procedure for freeing all four of the carriages is very simple. It varies somewhat, depending on the previous condition of the camera, but consists of no more than disengaging the cam follower assembly 172, FIGS. 2 and 8, from the cam 86 to free the carriage 160, releasing the main cam follower 126 from the cam 80 to release the carriage 82, disengaging as necessary the cam follower assembly 220 from the cam 206 and the locking plunger 350 from the receiver 366, FIG. 6, to release the carriage 212, and disengaging as necessary the latch 324 from the carriage frame 200, FIG. 6, and disengaging the cam follower 210 from the main cam 80 to release the carriage 84. None of this requires any particular skill.

The rotary control 36 is set to a position for producing enlargements having a size nine hundred percent of the copy size, this setting of the control 36 being effected by turning the control until the reading of the indicator means 346 is precisely nine times the focal length of the lens. The several carriages 83, 84, 160 and 212 are pushed by hand toward the end of the bed 40 remote from the plate holder 22 to starting positions illustrated in solid lines in FIG. 1. The starting position of the copy holder cam carriage 82 is determined by engagement of a preadjusted stop abutment 450, FIG. 5, on the carriage 82 with the transverse end plate 75 on the bed 40. With the cam carriage 82 located in its starting position in the manner recited and the control 36 in its starting position described, the main cam follower 126 on the carriage 82 is reengaged with the main cam 86. The cam follower assembly 172 is assembled in the bore 226, FIG. 8, overlying the secondary cam 222, FIG. 5, and engaged with the convolution of the cam 222 nearest the plate holder end of the sleeve 224, thus establishing the copy holder carriage 160 in its starting position.

A preadjusted abutment stop 452, FIGS. 1 and 5, supported in this instance on the carriage 82, engages the lens holder carriage 212 to locate the carriage 212 in its starting position, whereupon the locking plunger 350 is reengaged with the receiver 366 to fix the position of the carriage 84 in relation to the carriage 212. The cam follower 210 on the carriage 84 is then reengaged with the main cam 80 to complete the set up for using the new lens, except for adjustment of the lens aperture 240 (if necessary) to its starting position for nine hundred percent enlargement and shifting the lens control knob 298 (if necessary) to its downward position for enlargement.

This entire set up procedure for using a different lens is simple and routine. The camera is used with the twelve inch focal length to produce enlargements ranging from three hundred to nine hundred percent of the copy size. The mode of using the camera with the lens of shorter focal length is exactly the same as with the lens of longer focal length, except that in determining the setting of the control 36, the focal length of the new lens is used in determining the product to be read on the indicator means 346.

It should be noted that use of the electric power drive 440 to produce over-travel of the carriages 82, 84 along the tracks 48, 50 is precluded by limit switches 460, 462 secured to the bed 40, FIGS. 1 and 2, for operation by the carriages 82, 84 to deenergize the power actuator 440 before the carriages 82, 84 reach their extreme end positions. Translation of the carriages 82, 84 on to their extreme positions is completed by manual rotation of the control wheel 36.

As evident from the drawings, FIGS. 1 and 6, the transverse end plate 392 fixed to the plate holder end of the bed 40 supports bearings 464, 466, 468 which journal the adjacent ends of the longitudinal shafts 68, 66 and 230, repeatedly referred to. Medial support for the shafts 68, 66, 230, which extend longitudinally along the full length of the channel shaped bed 40, is provided by the cam carriages 82, 84, the shafts 68 and 230 being supported in the carriages 82, 84 by the previously described journal bearings for the cam sleeves 90, 224 and 204. A typical medial support bearing for the shaft 66 is represented by the sleeve bearing 470 mounted in the copy holder carriage frame 106 in supporting relation to the shaft 66, as shown in FIG. 9.

The invention is claimed as follows:

1. A process camera comprising, in combination, an elongated generally horizontal bed having two parallel tracks extending longitudinally therealong, a photographic plate holder extending upwardly from one end of said bed, a rotary main cam shaft extending longitudinally along said bed in parallel relation to said tracks and defining thereon a helical main cam having a constant pitch, a movable copy holder extending upwardly from said bed and being movably supported by a copy holder carriage supported on said tracks for movement therealong, a movable lens holder disposed between said plate holder and said copy holder and being supported by a lens holder supported on said tracks for movement therealong, an extraneous light excluding element extending between said lens holder and said plate holder, a rotary drive shaft extending longitudinally along said bed in parallel relation to said main cam shaft, a stationary transmission mounted on said bed at one end thereof and positively interconnecting said main cam shaft and said drive shaft to cause the two shafts to rotate in precise synchronization with each other, rotating means interconnected with said main cam shaft to rotate the latter and said drive shaft in positive synchronization produced and maintained by said transmission, a copy holder cam carriage and a lens holder cam carriage supported on said tracks for movement therealong; two hollow elongated cam sleeves defining respectively thereon, two substantially identical, secondary helical cams of progressively varying pitch; said cam sleeves being disposed in coaxial encircling relation to said drive shaft and being longitudinally slidable therealong, said drive shaft defining a drive surface extending longitudinally therealong, means on each of said cam sleeves coacting with said drive surface to cause the cam sleeve to rotate with said drive shaft, said cam carriages having means coacting with said respective cam sleeves to hold said cam sleeves against axial displacement in relation to the corresponding carriages, a main cam follower on each of said cam carriages cooperable with said main cam to cause the cam carriage to move along said tracks upon rotation of the main cam, means for releasing from said main cam the main cam follower on said lens holder cam carriage, two secondary cam followers disposed respectively on said copy holder carriage and cooperable with said respective secondary cams to effect movement of said copy holder carriage and said lens holder carriage along said tracks in relation to said copy holder cam carriage and said lens holder cam carriage respectively upon rotation of said secondary cams, means for disengaging from its coacting secondary cam the secondary cam follower on said lens holder carriage, means for releasably locking said lens holder cam carriage in a predetermined position on said bed, means for releasably locking said lens holder carriage with said lens holder cam carriage for movement in unison therewith by said main cam, a first indicator dial connected to said main cam shaft and having a fine position circular scale thereon, a second indicator dial journalled in coaxial relation to said first dial and having thereon a coarse position scale, a speed reducing drive interconnected between said main cam shaft and said second dial, lens aperture control means on said lens holder for progressively opening and closing a lens light aperture, and means including a transmission interconnecting said lens aperture control means with said drive shaft to drive said lens aperture control means in lens aperture opening and closing directions in response to rotary movements in opposite directions of said drive shaft.

2. A process camera for producing from generally flat copy mounted in the camera a photographic image having any desired size in relation to the size of the copy within a wide range of image size to copy size provided by the camera, comprising, in combination, an elongated generally horizontal bed having two longitudinal side edges extending upwardly from a central connecting member to define two rigid parallel tracks extending longitudinally along the bed, a photographic plate holder extending upwardly from one end of said bed in transverse relation to said tracks, a main cam shaft extending longitudinally along said bed in parallel relation to said tracks and defining thereon a helical main cam having a constant pitch therealong, means journalling said main cam shaft for rotation about the longitudinal axis thereof and holding said main cam shaft against axial displacement in relation to said plate holder, a copy holder extending upwardly from said bed in transverse relation to said tracks, a copy holder carriage supporting said copy holder and having flanged support wheels engaging said tracks to support said copy holder carriage and said copy holder on said tracks for movement longitudinally along said bed, a lens holder disposed movably between said plate holder and said copy holder, an extraneous light excluding element extending between said lens holder and said plate holder, a lens holder carriage similar to said copy holder carriage, said lens holder carriage supporting said lens holder and having flanged support wheels engaging said tracks to support said lens holder carriage and said lens holder on the tracks for movement longitudinally along the bed, a rotary drive shaft extending longitudinally along said bed in parallel relation to said tracks, means journalling said drive shaft for rotation about the axis thereof in a position that does not move longitudinally with respect to said bed, a stationary transmission mounted on said bed at one end thereof and comprising a plurality of gears meshing with each other and connected with both said main cam shaft and said drive shaft to cause the two to rotate in precise synchronization with each other, manual rotating means interconnected with said main cam shaft to rotate the latter and said drive shaft at relatively slow speeds in positive synchronization produced and maintained by said stationary transmission, power drive means interconnected with said transmission to effect relative high speed rotation of said main cam shaft and said drive shaft in synchronization maintained by said transmission, a copy holder cam carriage supported by wheels on said tracks for movement longitudinally therealong, a lens holder cam carriage supported by wheels on said tracks for movement longitudinally therealong, two hollow elongated cam sleeves defining respectively thereon two secondary helical cams substantially identical to each other and having progressively varying pitch, said cam sleeves being disposed in coaxial encircling relation to said drive shaft and being longitudinally slidable along said drive shaft, said drive shaft defining a drive surface extending longitudinally therealong, means on each of said cam sleeves coacting with said drive surface to cause the cam sleeve to rotate with said drive shaft, said cam carriages having bearing means journalling said respective cam sleeves for rotation and coacting with said respective cam sleeves to hold said cam sleeves against axial displacement in relation to the corresponding carriages, a main cam follower on each of said cam carriages cooperable with said main cam to cause the corresponding cam carriage to move longitudinally along said tracks upon rotation of the main cam, control means for releasing from said main cam the main cam follower on said lens holder carriage, said lens holder main cam follower having thereon a plurality of segmental helical cam engaging elements shaped and positioned to engage and be actuated by a plurality of convolutions of said main cam upon engagement of said last mentioned cam follower with the main cam, a secondary cam follower carried by said copy holder carriage and coacting with said secondary cam of said copy holder cam carriage to cause the copy holder carriage to move in relation to the copy holder cam carriage longitudinally along said tracks upon rotation of said secondary cams; the lead of said main cam, the lead of said secondary cam of said copy holder cam carriage and the directions and degrees of relative rotary motion of said main and secondary cams being such that the movement of said copy holder carriage relative to said copy holder cam carriage incident to rotation of said main and secondary cams is always less than and in a direction opposite to the cam produced motion of said cam carriage relative to said plate holder; a secondary cam follower carried by said lens holder carriage and being releasably engageable with said secondary cam of said lens holder cam carriage to cause the lens holder to move in relation to the copy holder cam carriage along said tracks upon rotation of said secondary cams, means for releasably locking said lens holder cam carriage in a predetermined position on said bed, and means for releasably locking said lens holder carriage to said lens holder cam carriage for movement in unison therewith along said tracks by said main cam.

3. A process camera comprising, in combination, a base, a photographic plate holder extending from said base, a rotary main cam shaft extending along said base in generally perpendicular relation to said plate holder, said cam shaft defining thereon a helical main cam having a constant pitch, a movable copy holder extending from said base and being movably supported by a copy holder carriage supported on said base for movement therealong in a path parallel to said cam shaft, a movable lens holder disposed between said plate holder and said copy holder and being supported by a lens holder carriage supported on said base for movement therealong in a path parallel to said cam shaft, an extraneous light excluding element extending between said lens holder and said plate holder, a rotary drive shaft extending longitudinally along said base in parallel relation to said main cam shaft, a stationary transmission mounted on said base and positively interconnecting said main cam shaft and said drive shaft to cause the two shafts to rotate in precise synchronization with each other, rotating means interconnected with said main cam shaft to rotate the latter and said drive shaft in positive synchronization produced and maintained by said stationary transmission, a copy holder cam carriage and a lens holder cam carriage supported on said base for movement therealong in paths parallel to said cam shaft; two hollow elongated cam sleeves defining respectively thereon, two substantially identical, secondary, helical cams of progressively varying pitch; said cam sleeves being disposed in coaxial encircling relation to said drive shaft and being longitudinally slidable therealong, said drive shaft defining a drive surface extending longitudinally therealong, means on each of said cam sleeves coacting with said drive surface to cause the cam sleeve to rotate with said drive shaft, said cam carriages having means coacting with said respective cam sleeves to hold said cam sleeves against axial displacement in relation to the corresponding carriages, a main cam follower on each of said cam carriages cooperable with said main cam to cause the cam carriage to move along said base upon rotation of the main cam, means for releasing from said main cam the main cam follower on said lens holder cam carriage, two secondary cam followers disposed respectively on said copy holder carriage and on said lens holder carriage and cooperable with said respective secondary cams to effect movement of said copy holder carriage and said lens holder carriage along said base in relation to said copy holder cam carriage and said lens holder cam carriage respectively upon rotation of said secondary cams, means for disengaging from its coacting secondary cam the secondary cam follower on said lens holder carriage, means for releasably locking said lens holder cam carriage in a predetermined position on said bed, and means for releasably connecting said lens holder carriage to said lens holder cam carriage for movement in unison therewith by said main cam.

4. A process camera comprising, in combination, a photographic plate holder, a rotary main cam shaft extending from said plate holder in generally perpendicular relation thereto, said cam shaft defining thereon a helical main cam having a constant pitch, a movable copy holder disposed in spaced confronting relation to said plate holder for translation toward and away from the latter, a movable lens holder disposed between said plate holder and said copy holder for translation toward and away from said plate holder, a rotary drive shaft disposed in parallel relation to said main cam shaft, a stationary transmission positively interconnecting said main cam shaft and said drive shaft to cause the two shafts to rotate in precise synchronization with each other and being interconnected with said main cam shaft and said drive shaft to told the two shafts in positions that do not move longitudinally, rotating means interconnected with said main cam shaft to rotate the latter and said drive shaft in positive synchronization produced and maintained by said stationary transmission, a hollow elongated cam sleeve defining thereon a secondary helical cam of progressively varying pitch, said cam sleeve being disposed in coaxial encircling relation to said drive shaft and being longitudinally slidable therealong, said drive shaft defining a drive surface extending longitudinally therealong, means on said cam sleeve coacting with said drive surface to cause the cam sleeve to rotate with said drive shaft, a cam positioning unit movable in a path parallel to said cam shaft and coacting with said cam sleeve to hold said cam sleeve against axial displacement in relation to the cam positioning unit, a first main cam follower on said cam positioning unit cooperable with said main cam to cause the cam positioning unit and said secondary cam to move longitudinally in relation to said drive shaft upon rotation of said cam shaft; a secondary cam follower engaging said secondary cam and coacting with said copy holder to produce, in response to rotation of said main cam shaft, translation of said copy holder relative to said plate holder to an extent that is equal to the algebraic sum of the movement of said first main cam follower along said main cam and movement of said secondary cam follower along said secondary cam; and a second main cam follower engaging said main cam and coacting with said lens holder to produce, in response to rotation of said main cam shaft, translation of said lens holder relative to said plate holder to an extent that is equal to the movement of said second cam follower along said main cam.

5. A process camera comprising, in combination, a base, a photographic plate holder extending from said base, a rotary main cam shaft extending along said base in generally perpendicular relation to said plate holder, said cam shaft defining thereon a helical main cam having a constant pitch, a movable copy holder extending from said base and being movably supported by a copy holder carriage supported on said base for movement therealong in a path parallel to said cam shaft, a movable lens holder disposed between said plate holder and said copy holder and being supported by a lens holder carriage supported on said base for movement therealong in a path parallel to said cam shaft, first and second rotary drive shafts extending longitudinally along said base in parallel relation to said main cam shaft, a stationary transmission mounted on said base and positively interconnecting said main cam shaft and both of said drive shafts to cause the three shafts to rotate in precise synchronization with each other, rotating means interconnected with said main cam shaft to rotate the latter and both of said drive shafts in positive synchronization produced and maintained by said stationary transmission, a copy holder cam carriage and a lens holder cam carriage supported on said base for movement therealong in paths parallel to said cam shaft; first and second hollow elongated cam sleeves defining respectively thereon, first and second, secondary, helical cams of progressively varying pitch; said first and second cam sleeves being disposed in coaxial encircling relation to said first drive shaft and being longitudinally slidable therealong, said first drive shaft defining a drive surface extending longitudinally therealong, means on each of said first and second cam sleeves coacting with said drive surface to cause the first and second cam sleeves to rotate with said first drive shaft, a third hollow elongated cam sleeve defining thereon a third secondary helical cam of progressively varying pitch, said third cam sleeve being disposed in coaxial encircling relation to said second drive shaft and being longitudinally slidable therealong, said second drive shaft defining a drive surface extending longitudinally therealong, means on said third cam sleeve coacting with said drive surface on said second drive shaft to cause said third cam sleeve to rotate with said second drive shaft, said copy holder cam carriage having means coacting with said first and third cam sleeves and said lens holder cam carriage having means coacting with said second cam sleeve to hold said respective cam sleeves against axial displacement in relation to the coacting carriages, a main cam follower on each of said cam carriages cooperable with said main cam to cause the cam carrige to move along said base upon rotation of the main cam, means for releasing from said main cam the main cam follower on each of said cam carriages, releasable secondary cam following means on said copy holder carriage releasably engageable with either of said first or said third secondary cams selectively to effect movement of said copy holder carriage in relation to said copy holder cam carriage upon rotation of said secondary cams, releasable secondary cam following means on said lens holder carriage releasably engageable with said second secondary cam to effect movement of said lens holder carriage in relation to said lens holder cam carriage upon rotation of said secondary cams; and locating means for locating each of said cam carriages, said copy holder carriage and said lens holder carriage in either of two starting positions along said cam shaft.

6. A process camera for producing from copy a photographic image having any desired size in relation to the size of the copy within a wide range of image size to copy size provided by the camera, comprising, a plate holder and a copy holder disposed in spaced aligned relation to each other, a lens holder disposed between said copy holder and said plate holder, a plurality of control cams, transmission means interconnected with said control cams to effect movement of said cams in positive synchronization with each other; means interconnecting said control cams with said plate holder, said copy holder, and said lens holder to effect coordinated translation relative to each other of said plate holder, said copy holder and said lens holder; a lens assembly mounted on said lens holder and including movable lens control means defining a lens light passage of variable size and providing for adjustment of the size of said lens light passage by actuation of the lens control means; and means interconnecting said transmission with said lens control means to actuate the latter to effect as an incident to relative translations of said lens holder toward and away from said plate holder simultaneous reductions and increases in the size of said lens light passage to maintain in the light image focused onto said plate holder from said copy holder a light intensity that remains substantially unaffected by translation in relation to each other of said plate holder, said copy holder and said lens holder by said cams synchronized by said transmission.

7. A process camera for producing from generally flat copy mounted in the camera a photographic image having any desired size in relation to the size of the copy within a wide range of image size to copy size provided by the camera, comprising, in combination, an elongated generally horizontal base, a photographic plate holder extending laterally from said base, a rotary cam shaft extending longitudinally along said base and defining thereon a helical main cam having a constant pitch therealong, a copy holder extending laterally from said base in spaced relation to said plate holder and being mounted on a copy holder carriage supported on said base for translation parallel to said cam shaft, means providing for swinging movement of said copy holder between a generally vertical operating position and a copy loading position tilted away from said operating position, copy lighting means mounted on said copy holder carriage to occupy a fixed lighting position in relation to said copy holder that is unchanged by translation of said carriage along said base, a lens holder disposed movably between said plate holder and said copy holder and being mounted on a a lens holder carriage supported on said base for translation parallel to said cam shaft, a rotary drive shaft extending longitudinally along said base in parallel relation to said cam shaft, a stationary transmission mounted on said base and connected with both said cam shaft and said drive shaft to cause the two shafts to rotate in precise synchronization with each other, means coacting with said cam shaft and said drive shaft to hold both shafts against longitudinal displacement, control means interconnected with said cam shaft to rotate the latter and said drive shaft in positive synchronization produced and maintained by said stationary transmission, a copy holder cam carriage and a lens holder cam carriage supported on said base for movement therealong in parallel relation to said cam shaft, two secondary cam members rotatable about axes parallel to said cam shaft and defining respectively two secondary helical cams having progressively varying pitch, said cam members being interconnected with said drive shaft for rotation by the latter and movement longitudinally therealong, thrust bearing means on said cam carriages coacting with said respective cam members to hold said cam members against axial displacement in relation to the corresponding carriages, a main cam follower on each of said cam carriages cooperable with said main cam to cause the corresponding cam carriage to move longitudinally with respect to said cam shaft upon rotation of the cam shaft, a secondary cam follower carried by said copy holder carriage and being cooperable with said secondary cam of said copy holder cam carriage to cause the copy holder carriage to move in relation to the copy holder cam carriage longitudinally with respect to said cam shaft upon rotation of the latter, and a secondary cam follower carried by said lens holder carriage and being cooperable with said secondary cam of said lens holder cam carriage to cause the lens holder carriage to move in relation to the copy holder cam carriage longitudinally with respect to said cam shaft upon rotation of the latter.

8. A process camera comprising, in combination, a base, a photographic plate holder extending from said base, a rotary main cam shaft extending along said base in generally perpendicular relation to said plate holder, said cam shaft defining thereon a helical main cam, a movable copy holder extending from said base and being movably supported by a copy holder carriage supported on said base for movement therealong in a path parallel to said cam shaft, a movable lens holder disposed between said plate holder and said copy holder and being supported by a lens holder carriage supported on said base for movement therealong in a path parallel to said cam shaft, first and second rotary drive shafts extending longitudinally along said base in parallel relation to said main cam shaft, a stationary transmission mounted on said base and positively interconnecting said main cam shaft and both of said drive shafts to cause the three shafts to rotate in precise synchronization with each other, rotating means interconnected with said main cam shaft to rotate the latter and both of said drive shafts in positive synchronization produced and maintained by said stationary transmission, a copy holder cam carriage and a lens holder cam carriage supported on said base for movement therealong in paths parallel to said cam shaft; first and second hollow elongated cam sleeves defining respectively thereon, first and second, secondary, helical cams of progressively varying pitch; said first and second cam sleeves being disposed in coaxial encircling relation to said first drive shaft and being longitudinally slidable therealong, said first drive shaft defining a drive surface extending longitudinally therealong, means on each of said first and second cam sleeves coacting with said drive surface to cause the first and second cam sleeves to rotate with said first drive shaft, a third hollow elongated cam sleeve defining thereon a third secondary helical cam of progressively varying pitch, said third cam sleeve being disposed in coaxial encircling relation to said second drive shaft and being longitudinally slidable therealong, said second drive shaft defining a drive surface extending longitudinally therealong, means on said third cam sleeve coacting with said drive surface on said second drive shaft to cause said third cam sleeve to rotate with said second drive shaft, said copy holder cam carriage having means coacting with said first and third cam sleeves and said lens holder cam carriage having means coacting with said second cam sleeve to hold said respective cam sleeves against axial displacement in relation to the coacting carriages, a main cam follower on each of said cam carriages releasably engageable with said cam to cause the cam carriage to move along said base upon rotation of the main cam, each of said main cam followers having thereon a plurality of segmental helical cam engaging elements shaped and positioned to engage and be actuated by a plurality of convolutions of said main cam upon engagement of the cam follower with the main cam, means for effecting movement into and out of engagement with said main cam the main cam follower on each of said cam carriages, releasably secondary cam follower means on said copy holder carriage releasably engageable with either of said first or said third secondary cams selectively to effect movement of said copy holder carriage in relation to said copy holder cam carriage upon rotation of said secondary cams, and releasable secondary cam following means on said lens holder carriage releasably engageable with said second secondary cam to effect movement of said lens holder carriage in relation to said lens holder cam carriage upon rotation of said secondary cams.

9. A process camera comprising, in combination, a photographic plate holder, a rotary main cam shaft extending away from said plate holder in generally perpendicular relation thereto, said cam shaft defining thereon a helical main cam, a movable copy holder disposed in spaced confronting relation to said plate holder for translation toward and away from the latter, a movable lens holder disposed between said plate holder and said copy holder for translation toward and away from said plate holder, a rotary drive shaft disposed in parallel relation to said cam shaft, a stationary transmission positively interconnecting said main cam shaft and said drive shaft to cause the two shafts to rotate in precise synchronization with each other and being interconnected with said cam shaft and said drive shaft to hold the two shafts in positions that do not move longitudinally, rotating means interconnected with said cam shaft to rotate the latter and said drive shaft in positive synchronization produced and maintained by said stationary transmission, a hollow elongated cam sleeve defining thereon a secondary helical cam of progressively varying pitch, said cam sleeve being disposed in coaxial encircling relation to said drive shaft and being longitudinally slidable therealong, said drive shaft defining a drive surface extending longitudinally therealong, means on said cam sleeve coacting with said drive surface to cause the cam sleeve to rotate with said drive shaft, a cam positioning unit movable in a path parallel to said cam shaft and coacting with said cam sleeve to hold said cam sleeve against axial displacement in relation to the cam positioning unit, a first main cam follower on said cam positioning unit cooperable with said main cam to cause the cam positioning unit and said secondary cam to move longitudinally in relation to said drive shaft upon rotation of said cam shaft; a secondary cam follower engaging said secondary cam and coacting with said copy holder to produce, in response to rotation of said main cam shaft, translation of said copy holder relative to said plate holder to an extent that is equal to the algebraic sum of the movement of said first main cam follower along said main cam and movement of said secondary cam follower along said secondary cam; a second main cam follower engaging said main cam and coacting with said lens holder to produce, in response to rotation of said main cam shaft, translation of said lens holder relative to said plate holder; a first indicator dial secured to the end of said main cam shaft adjacent said plate holder and having an endless circular scale thereon marked by one thousand evenly spaced graduations, a second indicator dial journalled in coaxial relation to said first dial and having a circular scale marked by graduations corresponding to successive revolutions of said main cam shaft, and a speed reducing drive interconnected between said main cam shaft and said second dial to turn the latter through an angle corresponding to the angular spacing between successive graduations on said second dial upon rotation of said main cam through each successive revolution.

10. A process camera comprising, in combination, a base, a photographic plate holder extending from said base, a rotary main cam shaft extending along said base in generally perpendicular relation to said plate holder, said cam shaft defining thereon a helical main cam, a movable copy holder extending from said base and being movably supported by a copy holder carriage supported on said base for movement therealong in a path parallel to said cam shaft, a movable lens holder disposed between said plate holder and said copy holder and being supported by a lens holder carriage supported on said base for movement therealong in a path parallel to said cam shaft, first and second rotary drive shafts extending longitudinally along said base in parallel relation to said main cam shaft, means coacting with said cam shaft and with said first and second drive shafts to hold each of said shafts against longitudinal displacement in relation to said base, a stationary transmission mounted on said base and positively interconnecting said main cam shaft and both of said drive shafts to cause the three shafts to rotate in precise synchronization with each other, rotating means interconnected with said main cam shaft to rotate the latter and both of said drive shafts in positive synchronization produced and maintained by said stationary transmission, a copy holder cam carriage and a lens holder cam carriage supported on said base for movement therealong in paths parallel to said cam shaft; first and second hollow elongated cam sleeves defining respectively thereon, first and second, secondary, helical cams of progressively varying pitch; said first and second cam sleeves being disposed in coaxial encircling relation to said first drive shaft and being longitudinally slidable therealong, said first drive shaft defining a drive surface extending longitudinally therealong, means on each of said first and second cam sleeves coacting with said drive surface to cause the first and second cam sleeves to rotate with said first drive shaft, a third hollow elongated cam sleeve defining thereon a third secondary helical cam of progressively varying pitch, said third cam sleeve being disposed in coaxial encircling relation to said second drive shaft and being longitudinally slidable therealong, said second drive shaft defining a drive surface extending longitudinally therealong, means on said third cam sleeve coacting with said drive surface on said second drive shaft to cause said third cam sleeve to rotate with said second drive shaft, said copy holder cam carriage having means coacting with said first and third cam sleeves and said lens holder cam carriage having means coacting with said second cam sleeve to hold said respective cam sleeves against axial displacement in relation to the coacting carriages, a releasable main cam follower on each of said cam carriages releasably engageable with said main cam to cause the cam carriage to move along said base upon rotation of the main cam, releasable secondary cam following means on said copy holder carriage releasably engageable with either said first secondary cam or said third secondary cam selectively to effect movement of said copy holder carriage in relation to said copy holder cam carriage upon rotation of said secondary cams, holding means on said base cooperable with said lens holder cam carriage to hold the latter in a predetermined stationary position on the base, and releasable secondary cam following means on said lens holder carriage releasably engageable with said second secondary cam to effect movement of said lens holder carriage in relation to said lens holder cam carriage upon rotation of said secondary cams while said lens holder cam carriage is held in said predetermined stationary position thereof by said holding means.

11. A process camera comprising, in combination, a photographic plate holder, a rotary main cam shaft extending away from said plate holder in generally perpendicular relation thereto, said cam shaft defining thereon a helical main cam, a movable copy holder disposed in spaced confronting relation to said plate holder for translation toward and away from the latter, a movable lens holder disposed between said plate holder and said copy holder for translation toward and away from said plate holder, a rotary drive shaft disposed in parallel relation to said cam shaft, a stationary transmission positively interconnecting said main cam shaft and said drive shaft to cause the two shafts to rotate in precise synchronization with each other, rotating means interconnected with said cam shaft to rotate the latter and said drive shaft in positive synchronization produced and maintained by said stationary transmission, a hollow elongated cam sleeve defining thereon a secondary helical cam of progressively varying pitch, said cam sleeve being disposed in coaxial encircling relation to said drive shaft and being longitudinally slidable therealong, said drive shaft defining a drive surface extending longitudinally therealong, means on said cam sleeve coacting with said drive surface to cause the cam sleeve to rotate with said drive shaft, a cam positioning unit movable in a path parallel to said cam shaft and coacting with said cam sleeve to hold said cam sleeve against axial displacement in relation to the cam positioning unit, a first main cam follower on said cam positioning unit cooperable with said main cam to cause the cam positioning unit and said secondary cam to move longitudinally in relation to said drive shaft upon rotation of said cam shaft; a secondary cam follower engaging said secondary cam and coacting with said copy holder to produce, in response to rotation of said main cam shaft, translation of said copy holder relative to said plate holder to an extent that is equal to the algebraic sum of the movement of said first main cam follower along said main cam and the movement of said secondary cam follower along said secondary cam; a second main cam follower engaging said main cam and coacting with said lens holder to produce, in response to rotation of said main cam shaft, translation of said lens holder relative to said plate holder; a first indicator element secured to said main cam shaft for rotation therewith in coaxial relation thereto, an endless circular scale carried by said first indicator element to indicate the instantaneous rotary position of said cam shaft, a second indicator element mounted for rotation in coaxial relation to said first indicator element and having an arcuate scale thereon marked by graduations corresponding to successive revolutions of said main cam shaft, and a speed reducing drive interconnected between said main cam shaft and said second indicator element to effect rotation of the latter to register on said arcuate scale cumulative revolutions of said cam shaft away from a reference position.

12. A process camera comprising, in combination, support structure, a photographic plate holder extending from said support structure, a rotary main cam shaft extending along said support structure in generally perpendicular relation to said plate holder, said cam shaft defining thereon a helical main cam, a copy holder confronting said plate holder and being supported by a movable copy holder carriage on said support structure for movement in a path parallel to said cam shaft, a movable lens holder disposed between said plate holder and said copy holder and being supported by a movable lens holder carriage on said support structure for movement in a path parallel to said cam shaft, first and second rotary drive shafts extending along said support structure in parallel relation to said main cam shaft, a stationary transmission positively interconnecting said main cam shaft and both of said drive shafts to cause the three shafts to rotate in precise synchronization with each other, rotating means interconnected with said main cam shaft to rotate the latter and both of said drive shafts in positive synchronization produced and maintained by said stationary transmission, a copy holder cam carriage and a lens holder cam carriage supported on said support structure for movement therealong in paths parallel to said cam shaft; first and second hollow elongated cam sleeves defining respectively thereon, first and second, secondary, helical cams of progressively varying pitch; said first and second cam sleeves being disposed in coaxial encircling relation to said first drive shaft and being longitudinally slidable therealong, said first drive shaft defining a drive surface extending longitudinally therealong, means on each of said first and second cam sleeves coacting with said drive surface to cause the first and second cam sleeves to rotate with said first drive shaft, a third hollow elongated cam sleeve defining thereon a third secondary helical cam of progressively varying pitch, said third cam sleeve being disposed in coaxial encircling relation to said second drive shaft and being longitudinally slidable therealong, said second drive shaft defining a drive surface extending longitudinally therealong, means on said third cam sleeve coacting with said drive surface on said second drive shaft to cause said third cam sleeve to rotate with said second drive shaft, said copy holder cam carriage having means coacting with said first and third cam sleeves and said lens holder cam carriage having means coacting with said second cam sleeve to hold said respective cam sleeves against axial displacement in relation to the coacting carriages, a releasable main cam follower on each of said cam carriages releasably engageable with said main cam to cause the cam carriage to move along said support structure upon rotation of the main cam, releasable connecting means for releasably connecting said lens holder carriage to said lens holder cam carriage for movement with the latter toward and away from said copy holder, releasable secondary cam following means on said copy holder carriage releasably engageable with either of said first secondary cam or said third secondary cam selectively to effect movement of said copy holder carriage in relation to said copy holder cam carriage upon rotation of said secondary cams, holding means cooperable with said lens holder cam carriage to hold the latter in a predetermined stationary position in relation to said plate holder, releasable secondary cam following means on said lens holder carriage releasably engageable with said second secondary cam to effect movement of said lens holder carriage in relation to said lens holder cam carriage upon rotation of said shafts while said lens holder cam carriage is held in said predetermined stationary position thereof by said holding means, first and second locating abutment means for locating said copy holder carriage in first and second starting positions in relation to said plate holder, and locating abutment means for locating said lens holder carriage in a starting position in relation to said plate holder.

13. A process camera comprising, in combination, a photographic plate holder, support structure extending away from said plate holder, a rotary main cam shaft extending along said support structure in generally perpendicular relation to said plate holder, said cam shaft defining thereon a helical main cam, a copy holder confronting said plate holder and being supported by a movable copy holder carriage on said support structure for movement in a path parallel to said cam shaft, a movable lens holder disposed between said plate holder and said copy holder and being supported by a movable lens holder carriage on said support structure for movement in a path parallel to said cam shaft, first and second rotary drive shafts journalled for rotation in longitudinally fixed positions parallel to said main cam shaft, a stationary transmission positively interconnecting said main cam shaft and both of said drive shafts to cause the three shafts to rotate in precise synchronization with each other, rotating means interconnected with said main cam shaft to rotate the latter and both of said drive shafts in positive synchronization produced and maintained by said stationary transmission, a copy holder cam carriage and a lens holder cam carriage supported on said support structure for movement therealong in paths parallel to said cam shaft; first and second hollow elongated cam sleeves defining respectively thereon, first and second, secondary, helical cams of progressively varying pitch; said first and second cam sleeves being disposed in coaxial encircling relation to said first drive shaft and being longitudinally slidable therealong, said first drive shaft defining a drive surface extending longitudinally therealong, means on each of said first and second cam sleeves coacting with said drive surface to cause the first and second cam sleeves to rotate with said first drive shaft, a third hollow elongated cam sleeve defining thereon a third secondary helical cam of progressively varying pitch, said third cam sleeve being disposed in coaxial encircling relation to said second drive shaft and being longitudinally slidable therealong, said second drive shaft defining a drive surface extending longitudinally therealong, means on said third cam sleeve coacting with said drive surface on said second drive shaft to cause said third cam sleeve to rotate with said second drive shaft, said copy holder cam carriage having means coacting with said first and third cam sleeves and said lens holder cam carriage having means coacting with said second cam sleeve to hold said respective cam sleeves against axial displacement in relation to the coacting carriages, a main cam follower on each of said cam carriages releasably engageable with said main cam to cause the cam carriage to move along said support structure upon rotation of the main cam, means for effecting movement into and out of engagement with said main cam the main cam follower on each of said cam carriages, releasable secondary cam following means on said copy holder carriage releasably engageable with either of said first secondary cam or said third secondary cams selectively to effect movement of said copy holder carriage in relation to said copy holder cam carriage upon rotation of said shafts, releasable holding means for releasably holding said lens holder cam carriage in a predetermined position in relation to said plate holder, releasable secondary cam following means on said lens holder carriage releasably engageable with said second secondary cam to effect movement of said lens holder carriage in relation to said lens holder cam carriage upon rotation of said shafts, a lens assembly mounted on said lens holder and including lens control means defining a lens light passage having a size that is varied by movement of a lens control element of the lens control means, a lens control transmission mounted on said lens holder carriage and having a rotary output element connected in driving relation to said lens control element, said lens control transmission having an input element coacting with one of said drive shafts for rotation thereby, and said lens control transmission including speed control and reversing means for reversing the direction of rotation and changing the speed of said transmission output element in relation to the direction of rotation and speed of said transmission input element.

14. A process camera for producing from generally flat copy mounted in the camera a photographic image having any desired size in relation to the size of the copy within a wide range of image size to copy size provided by the camera, comprising, in combination, a photographic plate holder, support structure extending away from said plate holder, a rotary cam shaft extending longitudinally along said support structure and defining thereon a helical main cam having a constant pitch, a copy holder confronting said plate holder, mounting means mounting said copy holder on a movable copy holder carriage on said support means for translation parallel to said cam shaft, said mounting means including means providing for swinging movement of said copy holder between a generally vertical operating position and a copy loading position tilted away from said operating position, copy lighting means mounted on said copy holder carriage to occupy in relation to said copy holder a fixed lighting position that is unchanged by translation of the carriage parallel to said shaft, a lens holder disposed movably between said plate holder and said copy holder and being mounted on a movable lens holder carriage on said support structure for translation parallel to said cam shaft, a rotary drive shaft extending longitudinally along said support structure in parallel relation to said cam shaft, a transmission connected with both said cam shaft and said drive shaft to cause the two shafts to rotate in precise synchronization with each other, means coacting with said cam shaft and said drive shaft to hold both shafts against longitudinal displacement, control means interconnected with said cam shaft to rotate the latter and said drive shaft in positive synchronization produced and maintained by said stationary transmission, a copy holder cam carriage supported on said support structure for movement therealong in parallel relation to said cam shaft, a secondary cam member rotatable about an axis parallel to said cam shaft and defining a secondary helical cam having a progressively varying pitch, said cam member being interconnected with said drive shaft for rotation by the latter and movement longitudinally therealong, means on said copy holder cam carriage coacting with said cam member to force said cam member to follow translation of the cam carriage in parallel relation to said cam shaft, a main cam follower on said cam carriage cooperable with said main cam to cause the cam carriage to move longitudinally with respect to said cam shaft upon rotation of the cam shaft, a secondary cam follower on said copy holder carriage cooperable with said secondary cam to cause the copy holder carriage to move in relation to the copy holder cam carriage longitudinally with respect to said cam shaft upon rotation of said shafts; and means for interconnecting said lens holder carriage with said main cam to effect, upon rotation of said cam shaft, synchronized translation of said lens holder carriage and said copy holder cam carriage along said cam shaft.

15. A process camera for producing from copy a photographic image having any desired size in relation to the size of the copy within a wide range of image size to copy size provided by the camera, comprising, a plate holder and a copy holder disposed in spaced mutually confronting relation to each other, said plate holder including means defining an image plane on the plate holder, a lens holder disposed between said copy holder and said plate holder, a lens assembly mounted on said lens holder, a plurality of control cams, transmission means interconnected with said control cams to effect movement of said cams in positive synchronization with each other; means interconnecting said control cams with said plate holder, said copy holder, and said lens holder to effect coordinated translation relative to each other of said plate holder, said copy holder and said lens holder to vary the size of an image focussed on said plate holder image plane by said lens assembly of copy on said copy holder while maintaining the image continuously in focus, light control means for varying the quantity of image light that is directed onto said plate holder image plane by said lens assembly for photographic recordings; and means interconnecting said transmission with said light control means to actuate the latter as an incident to relative translations of said lens holder toward and away from said plate holder to compensate for changes in the spacing of said lens assembly from said image plane so that the quantity of image light that is directed onto said plate holder image plane for photographic recording is substantially unaffected by translation in relation to each other of said plate holder, said copy holder and said lens holder by said cams synchronized by said transmission.

16. A process camera comprising, in combination, a photographic plate holder, a rotary main cam shaft extending away from said plate holder in generally perpendicular relation thereto, said cam shaft defining thereon a helical main cam, a movable copy holder disposed in spaced confronting relation to said plate holder for translation toward and away from the latter, a movable lens holder disposed between said plate holder and said copy holder for translation toward and away from said plate holder, a rotary drive shaft disposed in parallel relation to said cam shaft, a stationary transmission positively interconnecting said main cam shaft and said drive shaft to cause the two shafts to rotate in precise synchronization with each other and being interconnected with said cam shaft and said drive shaft to hold the two shafts in positions that do not move longitudinally, rotating means inerconnected with said cam shaft to rotate the latter and said drive shaft in positive synchronization produced and maintained by said stationary transmission, a secondary cam member rotatable about an axis parallel to said drive shaft and defining thereon a secondary helical cam of progressively varying pitch, said secondary cam member being movable longitudinally with respect to said drive shaft and being positively interconnected with said drive shaft for rotation by the latter, a cam positioning unit movable in a path parallel to said cam shaft and coacting with said secondary cam member to hold the latter against axial displacement in relation to the cam positioning unit, a main cam follower on said cam positioning unit cooperable with said main cam to cause the cam positioning unit and said secondary cam to move longitudinaly in relation to said drive shaft upon rotation of said cam shaft; a secondary cam follower engaging said secondary cam and coacting with said copy holder to produce, in response to rotation of said main cam shaft, translation of said copy holder relative to said plate holder to an extent that is equal to the algebraic sum of the movement of said main cam follower along said main cam and movement of said secondary cam follower along said secondary cam, and means interconnecting said lens holder with said main cam to produce, in response to rotation of said main cam shaft, translation of said lens holder relative to said plate holder to an extent that is equal to the concurrent translation of said cam positioning unit relative to said plate holder.

17. A process camera comprising, in combination, a photographic plate holder, support structure extending from said plate holder, a rotary main cam shaft extending from said plate holder, a rotary main cam shaft extending from said plate holder in generally perpendicular relation thereto, said cam shaft defining thereon a helical main cam having a constant pitch, a copy holder disposed in spaced confronting relation to said plate holder and being supported by a movable copy holder carriage on said support structure for translation parallel to said cam shaft, a movable lens holder disposed between said plate holder and said copy holder and being supported by a movable lens holder carriage on said support structure for translation parallel to said cam shaft, a rotary drive shaft parallel to said cam shaft, a stationary transmission positively interconnecting said cam shaft and said drive shaft to cause the two shafts to rotate in precise synchronization with each other, rotating means interconnected with said main cam shaft to rotate the latter and said drive shaft in positive synchronization produced and maintained by said stationary transmission, a copy holder cam carriage and a lens holder cam carriage movable in paths parallel to said cam shaft; two hollow elongated cam sleeves defining respectively thereon, two substantially identical, secondary, helical cams of progressively varying pitch; said cam sleeves being disposed in coaxial encircling relation to said drive shaft and being longitudinally slidable therealong, said drive shaft defining a drive surface extending longitudinally therealong, means on each of said cam sleeves coacting with said drive surface to cause the cam sleeve to rotate with said drive shaft, said cam carriages having means coacting with said respective cam sleeves to hold said cam sleeves against axial displacement in relation to the corresponding cam carriages, means for interconnecting said cam carriages with said main cam to effect translation of the cam carriages in unison along said main cam upon rotation of the main cam, and two secondary cam followers interconnecting said copy holder carriage and on said lens holder carriage respectively with said respective secondary cams to effect translation of said copy holder carriage and said lens holder carriage in relation to said copy holder upon rotation of said shafts.

18. In a photographic focusing device, having a negative holder, a lens holder, and a copy holder, operatively disposed along an optical axis, the combination of a stationary supporting structure, a pair of carriages movable on said structure along a fixed axis, a negative holder carried by said structure in operatively fixed relation to said axis, a lens holder carried by the carriage adjacent to said negative holder, and a copy holder carried by the other carriage, said last mentioned carriage comprising a base member movable along said supporting structure and a slide member movable relative to said base member, an axial fixed rotatable threaded drive shaft operatively journaled in said supporting structure having threads thereon of constant pitch, means carried by the base member engageable with said threads for transmitting movement thereto, said copy holder being supported by and movable with said slide member, a second axially fixed rotatable drive shaft journaled in said supporting structure, a sleeve concentric with and slidable along said last mentioned shaft, axially fixed with respect to said base member, said sleeve having external threads thereon of variable pitch, means operatively connecting said second shaft and sleeve for transmitting rotation from such shaft to the sleeve, means carried by said slide member engageable with the threads on said sleeve whereby movement between the base and slide members is controlled by said variable pitch thread, means for effecting movement of said lens holder carriage at a constant rate, as determined by said constant pitch threads, for photographic enlarging operations and variable pitch screw means operatively related to said lens supporting carriage for moving the lens holder relative to said supporting structure in accordance with such variable pitch threads, and detachable means for operatively connecting said lens holder to said last mentioned screw means for photographic reducing operations, the constant and variable pitch of the respective threads being such that throughout their relative movements, for either reducing or enlarging operations, the negative, lens and copy will be maintained in proper focused relation.

19. A photographic focusing device as defined in claim 18, wherein said lens supporting carriage comprises a base member movable on said supporting structure and a slide member movable relative to said base member, means for rigidly connecting said last mentioned base and slide members, and means for transmitting movement thereto in accordance with the constant pitch threads for enlarging operations.

20. A photographic focusing device as defined in claim 19, wherein the variable pitch screw means operatively related to said lens supporting carriage is supported in axially fixed relation relative to the base member of said lens carriage and for reducing operations, said lens holder carriage is operatively connected to the base structure in rigid relation thereto, and means for operatively connecting the slide of said lens carriage with said variable pitch screw to move said slide member at a non-linear rate relative to said base member and said base structure.

21. A photographic focusing device as defined in claim 20, wherein the base member of each carriage is provided with guide means cooperable with guide means formed on said supporting structure for restricting movement of the respective base members, other than in a direction parallel to said optical axis, and guide means at opposite ends of the respective slide members, the guide means at one end of each slide member being cooperable with means formed on the associated base member, and at the opposite ends of each slide member being cooperable with said guide means on said supporting structure.

22. A photographic focusing device as defined in claim 20, wherein said threaded drive shaft is provided, at the end thereof, adjacent said negative holder with a manually actuated hand wheel, counter means operatively connected to such drive shaft for indicating complete revolutions thereof, and means operatively related to said drive shaft for indicating fractions of a revolution thereof.

23. A photographic focusing device as defined in claim 22, wherein said fractional indicating means comprises a graduated driven scale rotatable with said shaft and cooperable with stationary indexing means operatively carried by said supporting structure.

24. A photographic focusing device as defined in claim 23, wherein said indexing means includes a vernier scale cooperable with said driven scale for indicating fractions of the graduations of said driven scale.

25. A photographic focusing device as defined in claim 20, wherein each slide member is provided with a downwardly depending bearing member extending through a longitudinally extending opening in the associated base member and having a bore therein through which the associated threaded sleeve member extends, the means carried by such slide member engageable with the threads of such sleeve being detachably engaged with said bearing member.

26. A photographic focussing device as defined in claim 25, wherein the means carried by each slide member engageable with the variable pitch means of the associated sleeve comprises an elongated stem member having an outer head portion, an inner portion, and an intermediate extending threaded portion detachably engageable with cooperable threads found in the associated bearing member, said stem member having an axial base therein in which is disposed a cylindrical key member, one end of which is adapted to extend from the inner end of said stem member, and provided at its protruding end with a conical portion having a longitudinal cross section which mates with the threads of the associated sleeve, a spherical bearing member disposed in such base engageable with the inner end of said key member, and means for adjusting the position of said bearing and key members relative to said stem member and thereby relates to the associated sleeve.

27. In a photographic focusing device, having a negative holder, a lens holder, and a copy holder, operatively disposed along an optical axis, the combination of a stationary supporting structure, a pair of carriages movable on said structure along a fixed axis, a negative holder carried by said structure in operatively fixed relation to said axis, a lens holder carried by the carriage adjacent to said negative holder, and a copy holder carried by the other carriage, said lens holder carriage comprising a base member movable along said supporting structure and a slide member movable relative to said base member, a rotatable drive shaft operatively journaled in said supporting structure, a sleeve concentric with and slidable along said shaft, axially fixed with respect to said base member, said sleeve having external threads thereon of variable pitch, means operatively connecting said shaft and sleeve for transmitting rotation from such shaft to the sleeve, means carried by said slide member engageable with the threads on said sleeve whereby movement between the base and slide members is controlled by said variable pitch thread, detachable means for operatively connecting said base member to said supporting structure for photographic reducing operations, and means, including variable pitch screw means operatively related to said copy holder carriage for moving the latter relative to said supporting structure, whereby throughout their relative movement the negative, lens and copy will be maintained in proper focused relation.

28. In a photographic focusing device, having a negative holder, a lens holder, and a copy holder, operatively disposed along an optical axis, the combination of means including a pair of carriages for supporting said holders for relative movement toward and away from one another for effecting desired focusing relations therebetween during enlarging or reducing operations, one of said holders being stationary relative to said supporting means, an axially fixed rotatable member, having threads thereon of constant pitch, operatively journaled in said supporting means, a pair of axially movable members having threads thereon of variable pitch, each of said members being rotatably mounted in axially fixed relation to a respective carriage, means for rotating said members in predetermined relation, means for selectively connecting each of the movable holders to respective threaded members in predetermined relation for effecting movement of said holders along said axis, the constant pitch and the variable pitch of the respective members being such that, throughout their respective movements, in one corrective arrangement, the holders will be in focused relation for enlarging operations, and in another corrective arrangement will be in focused relation for reducing operations.

29. A photographic focusing device as defined in claim 28, wherein carriages each are movable relative to the respective holder carried thereby, a coupling member operatively connecting said carriages for enlarging operations, means for locking one of said holders to its associated carriage, the other holder being moved at a variable rate relative to its carriage to maintain the desired focused relation.

30. A photographic focusing device as defined in claim 28, wherein the respective means for connecting each movable holder to its respective variable pitch member comprises a body member detachably engageable with the associated holder, said body member having a bore therein extending transversely to the associated variable pitch member, a cylindrically shaped key member disposed in such bore with an end thereof extending from the bore and constructed to operatively mate with the threads of the associated variable pitch member, adjustable means disposed in the bore of the body member for controlling the position of the key member relative to such threads, and a spherical bearing member interposed between said key member and said adjustable means.

31. A photographic focusing device as defined in claim 28, wherein said carriages each are movable relative to the respective holder carried thereby, means for connecting the carriage associated with said lens holder to said constant pitch rotatable member, for enlarging operations and means for rigidly connecting the lens holder relative to its carriage.

32. A photographic focusing device as defined in claim 31, wherein said connecting means for said lens holder carriage comprises a key member operatively carried by said carriage having means for engaging the thread on said constant pitch member, said key member carrying means for locking the lens holder to the carriage.

33. In a photographic focusing device, having a negative holder, a lens holder, and a copy holder, operatively disposed along an optical axis, the combination of means including a pair of carriages for supporting said holders for relative movement toward and away from one another for effecting desired focusing relations therebetween during enlarging or reducing operations, one of said holders being stationary relative to said supporting means, means for selectively moving said carriages at a constant rate, rotatable sleeve members for moving each of said carriages at a variable rate, each of said members being rotatably mounted in axially fixed relation to a respective carriage, a rotatable drive shaft concentric with said sleeve members, and means for rotatably connecting each of said sleeve members with said drive shaft, comprising a spherical key member for each sleeve member, said shaft having a longitudinally extending keyway of semi-circular transverse cross-section and each sleeve having a similarly shaped recess cooperable therewith with the associated key member being disposed therein, locking said shaft and sleeve members as to relative rotation but permitting axial movement therebetween.

34. In a photographic focusing device, having a negative holder, a lens holder, and a copy holder, operatively disposed along an optical axis, the combination of means including a pair of carriages for supporting said holders for relative movement toward and away from one another for effecting desired focusing relations therebetween during enlarging or reducing operations, one of said holders being stationary relative to said supporting means, an axially fixed rotatable member having threads thereon of constant pitch, operatively journaled in said supporting means, means for selectively connecting said carriages to said rotatable means, a pair of axially movable members having threads thereon of variable pitch, each of said members being rotatably mounted in axially fixed relation to a respective carriage, means for rotating said members in predetermined relation, means for selectively connecting each of the movable holders to respective variable pitch members in predetermined relation for effecting movement of said holders along said axis, relative to their respective carriages, the constant pitch and the variable pitch of the respective members being such that, throughout their respective movements, in one connective arrangement, the holders will be in focused relation for enlarging operations, and in another connective arrangement, will be in focused relation for reducing operations.

References Cited by the Examiner
UNITED STATES PATENTS 2,938,427   5/60   Alves                 88—24

NORTON ANSHER, *Primary Examiner.*